(12) United States Patent
Kim et al.

(10) Patent No.: US 10,149,132 B2
(45) Date of Patent: Dec. 4, 2018

(54) PEDESTRIAL CRASH PREVENTION SYSTEM AND OPERATION METHOD THEREOF

(71) Applicant: LG ELECTRONICS INC., Seoul (KR)

(72) Inventors: Yeongoo Kim, Seoul (KR); Yangdoo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 153 days.

(21) Appl. No.: 15/247,360

(22) Filed: Aug. 25, 2016

(65) Prior Publication Data

US 2017/0060130 A1  Mar. 2, 2017

(30) Foreign Application Priority Data

Aug. 27, 2015  (KR) .......................... 10-2015-0121208

(51) Int. Cl.
| | | |
|---|---|---|
| *H04W 4/80* | (2018.01) | |
| *H04L 12/26* | (2006.01) | |
| *H04W 40/24* | (2009.01) | |
| *H04W 4/02* | (2018.01) | |
| *H04W 88/02* | (2009.01) | |

(52) U.S. Cl.
CPC ............... *H04W 4/80* (2018.02); *H04L 43/16* (2013.01); *H04W 4/027* (2013.01); *H04W 40/244* (2013.01); *H04W 88/02* (2013.01)

(58) Field of Classification Search
CPC ......... G08G 1/166; B60Q 5/006; B60Q 1/525
See application file for complete search history.

(56) References Cited

U.S. PATENT DOCUMENTS

| | | | |
|---|---|---|---|
| 9,483,948 B1* | 11/2016 | Gordon ................ | G08G 1/166 |
| 2011/0090093 A1 | 4/2011 | Grimm et al. | |
| 2012/0119893 A1 | 5/2012 | Cemper | |
| 2013/0210460 A1* | 8/2013 | Subramanian ...... | B61L 15/0027 455/456.3 |
| 2015/0035685 A1* | 2/2015 | Strickland ............ | B60Q 9/008 340/901 |
| 2015/0091740 A1* | 4/2015 | Bai ....................... | G08B 21/06 340/901 |

FOREIGN PATENT DOCUMENTS

| | | |
|---|---|---|
| KR | 10-2010-0130483 | 12/2010 |
| KR | 10-1354049 | 2/2014 |

OTHER PUBLICATIONS

International Search Report issued in Application PCT/KR2016/009281 dated Dec. 12, 2016.

\* cited by examiner

*Primary Examiner* — Dale Moyer
(74) *Attorney, Agent, or Firm* — KED & Associates, LLP

(57) ABSTRACT

An autonomous vehicle may provide bidirectional communication with mobile terminals of pedestrians. The autonomous vehicle may include a short range communication module for providing a communication interface, and a controller for, when a specific driving condition occurs, activating wireless communication through the short range communication module, periodically broadcasting a beacon signal including vehicle location and speed information, and calculating a danger level for each pedestrian based on pedestrian information included in a response signal corresponding to the beacon signal.

17 Claims, 16 Drawing Sheets

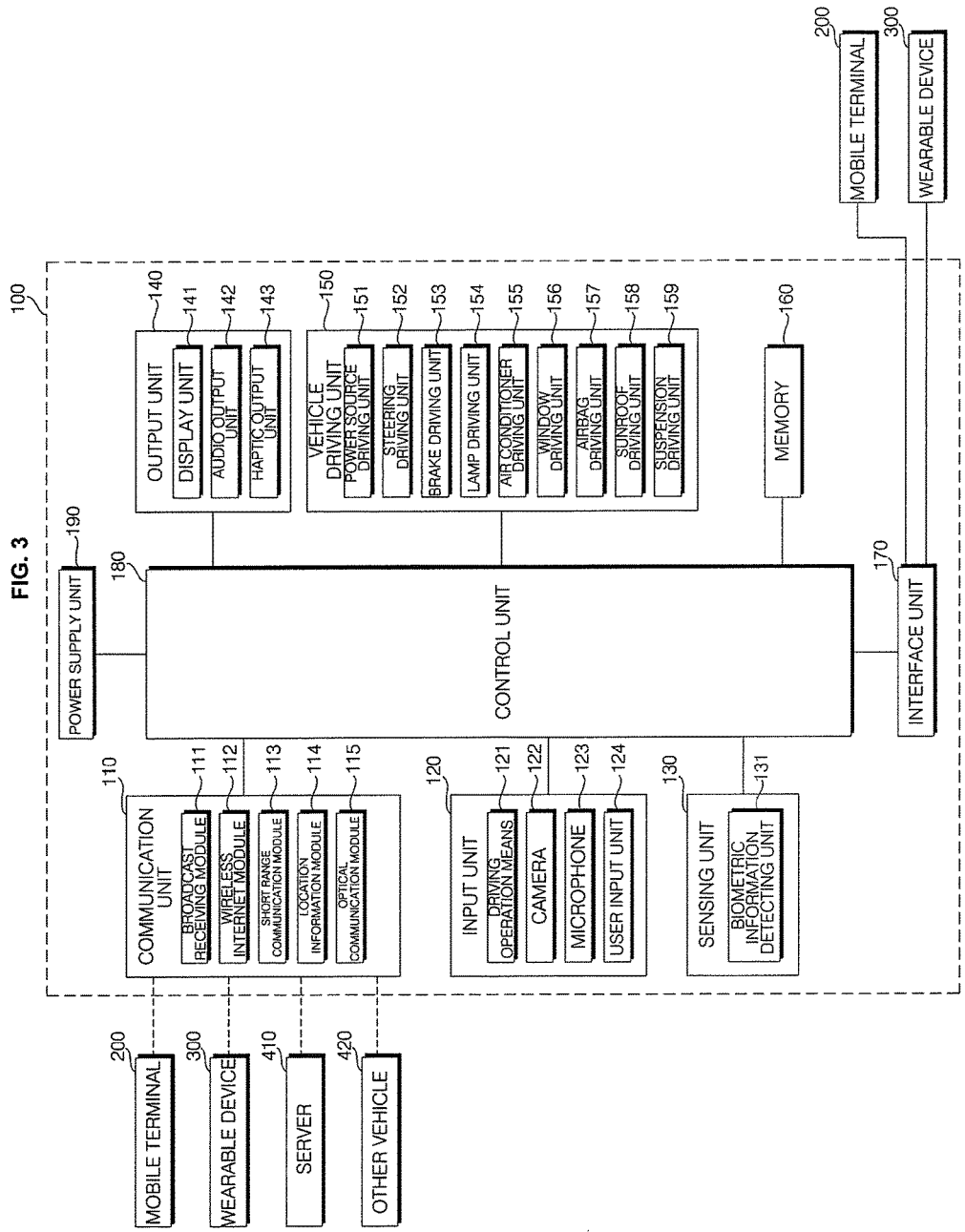

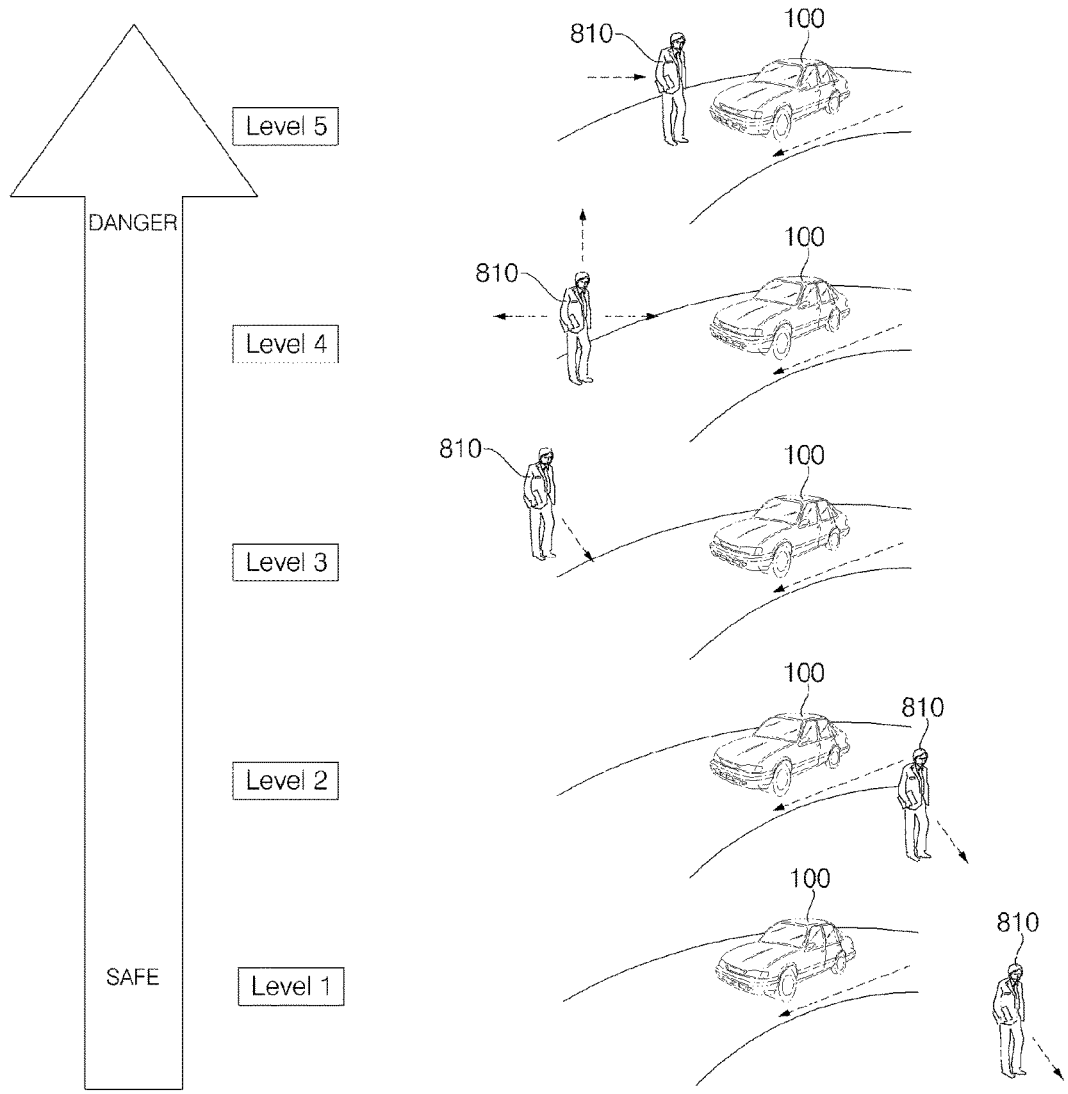

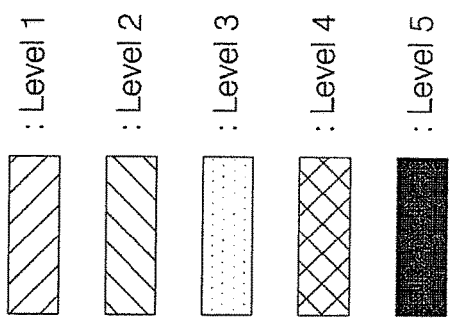
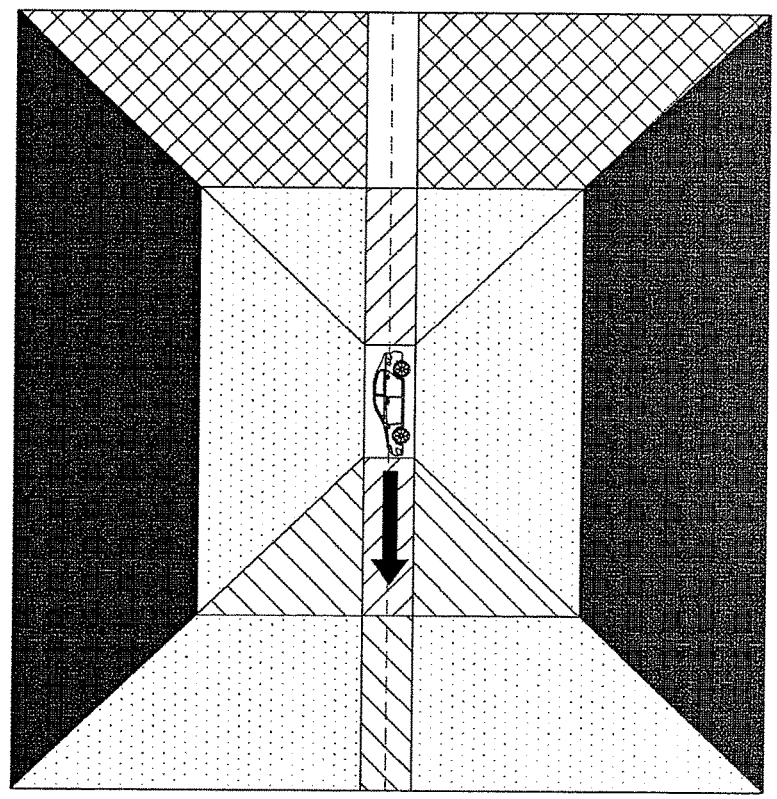
FIG. 8b

FIG. 12
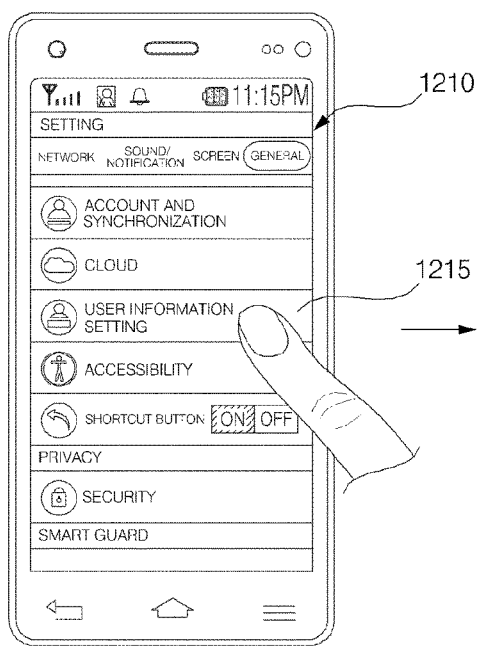
(a)
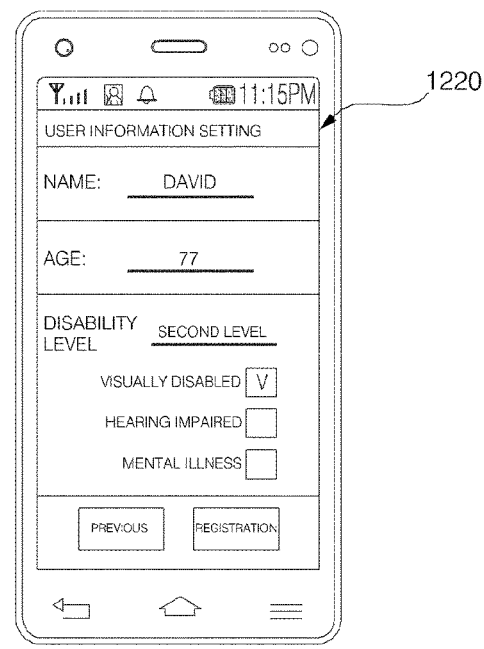
(b)

PEDESTRIAL CRASH PREVENTION SYSTEM AND OPERATION METHOD THEREOF

CROSS-REFERENCE TO RELATED APPLICATION

This application claims priority under 35 U.S.C. § 119 to Korean Application No. 10-2015-0121208, filed Aug. 27, 2015, the subject matter of which is hereby incorporated by reference.

BACKGROUND

1. Field

Embodiments may relate to a pedestrian crash prevention system and an operating method thereof. More particularly, embodiments may relate to a pedestrian crash prevention system and an operating method thereof, using bidirectional wireless communication between an autonomous vehicle and pedestrians.

2. Background

Terminals may be classified as mobile/portable terminals or stationary terminals according to mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality that supports game playing, while other terminals are configured as multimedia players. Mobile terminals have been configured to receive broadcast and multicast signals that permit viewing of content such as videos and television programs.

A vehicle is an apparatus that is moved in a direction desired by a user who rides the vehicle.

An example of the vehicle is an automobile. Research has been actively conducted into communications between a vehicle and a mobile terminal. Further, research has also been actively conducted into an autonomous vehicle that autonomously moves without a driver.

As autonomous vehicles have been generalized and a number of pedestrians using smart devices has increased, it is expected that a danger that pedestrians are exposed to traffic accidents has gradually increased because they do not recognize a vehicle that is being autonomously driven.

Additionally, because an autonomous vehicle may prevent a crash with a pedestrian based on a camera and a sensor attached to a vehicle, it is expected that it is not easy to prevent a crash with people who suddenly rush into an apartment complex, in front of a school, and in a parking lot, and/or the like. Accordingly, there is a need for a method for effectively preventing crashes with pedestrians who suddenly rush while such autonomous vehicles are slowly driven.

BRIEF DESCRIPTION OF THE DRAWINGS

Arrangements and embodiments may be described in detail with reference to the following drawings in which like reference numerals refer to like elements and wherein:

FIG. 3 is a block diagram of the vehicle according to the exemplary embodiment;

FIGS. 8A and 8B are diagrams for explanation of a method for classifying a danger level of a pedestrian;

FIG. 12 is a diagram for explaining an operation of a mobile terminal that sets user information required to determine pedestrian group information.

DETAILED DESCRIPTION

Description may now be given in detail according to exemplary embodiments disclosed herein, with reference to the accompanying drawings. For the sake of brief description with reference to the drawings, the same or equivalent components may be provided with the same reference numbers, and description thereof may not be repeated.

A suffix such as "module" and "unit" may be used to refer to elements or components. Use of such a suffix herein is merely intended to facilitate description of the specification, and the suffix itself is not intended to give any special meaning or function.

In the present disclosure, that which is well-known to one of ordinary skill in the art has generally been omitted for the sake of brevity. The accompanying drawings may be used to help easily understand various technical features and it should be understood that embodiments presented herein are not limited by the accompanying drawings. As such, the present disclosure should be construed to extend to any alterations, equivalents and substitutes in addition to those that are particularly set out in the accompanying drawings.

It may be understood that although the terms first, second, etc. may be used herein to describe various elements, these elements should not be limited by these terms. These terms may be generally only used to distinguish one element from another.

It may be understood that when an element is referred to as being "connected with" another element, the element can be connected with the other element or intervening elements may also be present. In contrast, when an element is referred to as being "directly connected with" another element, there may be no intervening elements present.

A singular representation may include a plural representation unless it represents a definitely different meaning from the context. Terms such as "include" or "has" may be used herein and should be understood that they are intended to indicate an existence of several components, functions or steps, disclosed in the specification, and it is also understood that greater or fewer components, functions, or steps may likewise be utilized.

A vehicle described in the present specification may have a concept including an automobile and a motorcycle. Hereinafter, a vehicle may be described based on an automobile.

The vehicle described in the present specification may have a concept including all of an internal combustion engine vehicle including an engine as a power source, a hybrid electric vehicle including an engine and an electric motor as power sources, an electric vehicle including an electric motor as a power source, and the like.

Figure 1:
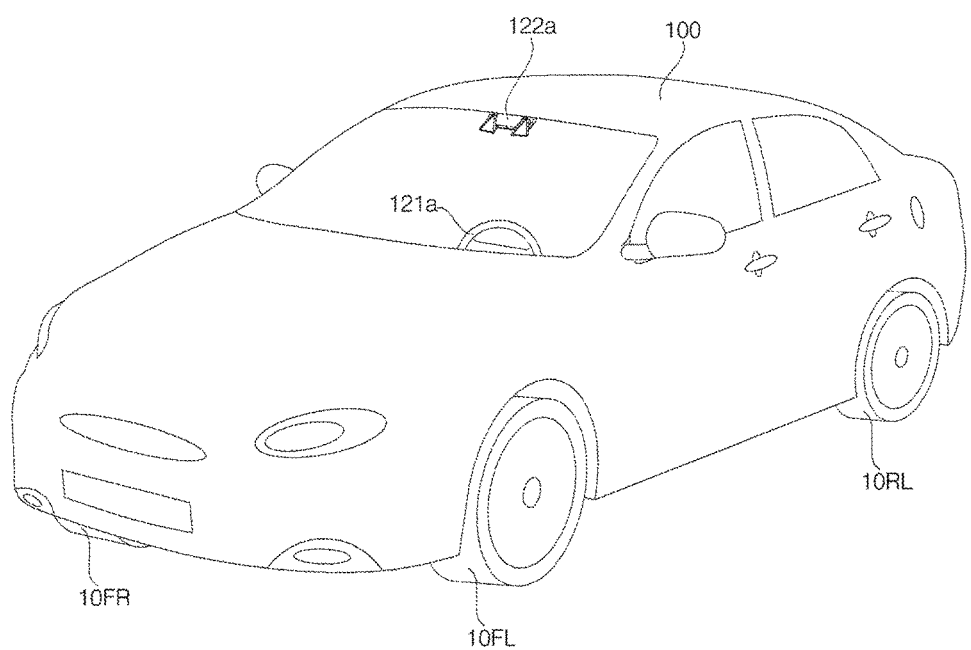
FIG. 1 is a diagram illustrating an appearance of a vehicle according to an exemplary embodiment.
Figure 2:
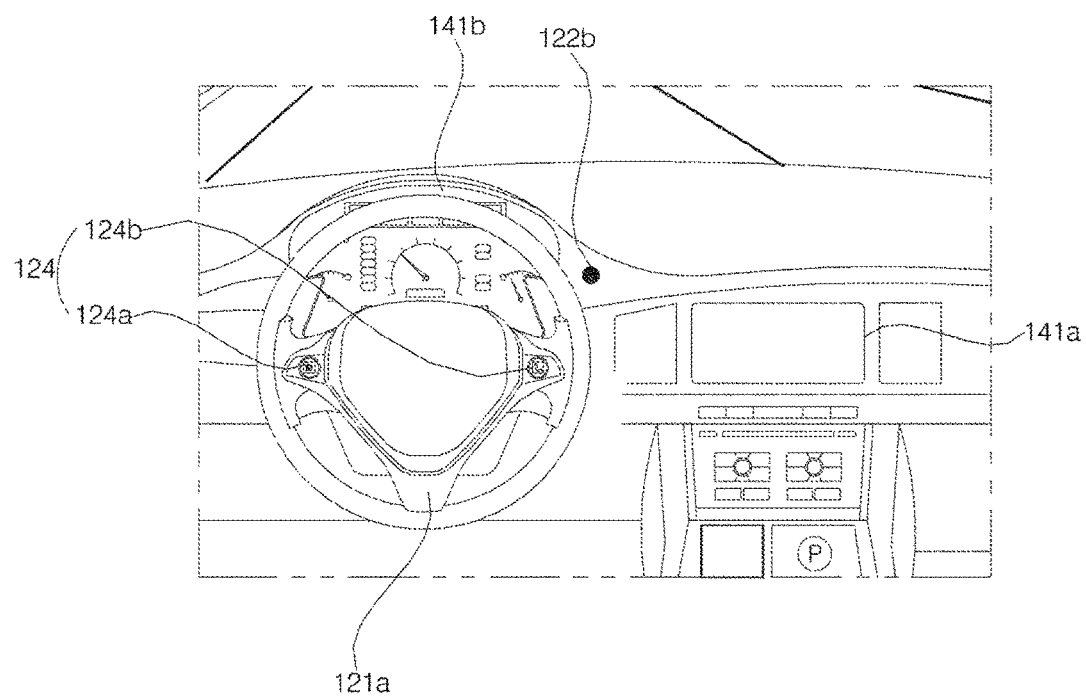
FIG. 2 is a diagram illustrating a cockpit module included in the vehicle according to the exemplary embodiment.

FIG. 1 is a diagram illustrating an appearance of a vehicle according to an exemplary embodiment. FIG. 2 is a diagram illustrating a cockpit module included in the vehicle according to the exemplary embodiment. Other embodiments and configurations may also be provided.

Referring to FIGS. 1 and 2, a vehicle 100 may include wheels 10FR, 10FL, 10RL, . . . rotated by a power source, a driving input means 121a (or driving input device) for adjusting a movement direction of the vehicle 100, a camera 122a for photographing an image at a front side of the vehicle, and various electronic units (or devices) included inside the vehicle 100.

The vehicle 100 may include a camera 122b for photographing an image inside the vehicle, a first display device 141a and a second display device 141b for visually displaying various information, and an interface unit 170 (or interface) electrically connected with a wearable device 300.

The interface unit 170 may include a holding part formed so that the wearable device 300 may be held, and a connection part to connect with the wearable device 300.

FIG. 3 is a block diagram of the vehicle according to the exemplary embodiment. Other embodiments and configurations may also be provided.

Referring to FIG. 3, the vehicle 100 may include a communication unit 110, an input unit 120, a sensing unit 130, an output unit 140, a vehicle driving unit 150, a memory 160, an interface unit 170, a control unit 180 (or controller), and a power supply unit 190.

The communication unit 110 may include one or more modules capable of establishing wireless communication between the vehicle 100 and the wearable device 300, the vehicle 100 and a mobile terminal 200, the vehicle 100 and an external server 410, or the vehicle 100 and another vehicle 420. The communication unit 110 may include one or more modules to connect the vehicle 100 to one or more networks.

The communication unit 110 may include a broadcast receiving module 111, a wireless Internet module 112, a short range communication module 113, a location information module 114, and an optical communication module 115.

The broadcast receiving module 111 may receive a broadcast signal or broadcast-related information from an external broadcast management server through a broadcast channel. The broadcast may include radio broadcast or TV broadcast.

The wireless Internet module 112 may refer to a module for wireless Internet connection, and may be contained inside or outside the vehicle 100. The wireless Internet module 112 may be configured to transceive a wireless signal in a communication network according to wireless Internet technologies.

Examples of the wireless Internet technology may include a wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), and long term evolution advanced (LTE-A), and the wireless Internet module 112 may transceive data according to one or more wireless Internet technologies within a range including non-listed Internet technologies.

The short range communication module 113 may be for short range communication, and may support short range communication by using at least one of Bluetooth™, radio frequency identification (RFID), infrared data association (IrDA), ultra wideband (UWB), ZigBee, near field communication (NFC), Wi-Fi, Wi-Fi Direct, and wireless universal serial bus (wireless USB) technologies.

The short range communication module 113 may perform short range communication between the vehicle 100 and one or more external devices by forming a short range wireless communication network.

The location information module 114 may refer to a module for obtaining a location of the vehicle 100, and a representative example may include a global positioning system (GPS) module. For example, when a mobile terminal utilizes a GPS module, a location of the mobile terminal may be determined by using a signal transmitted from a GPS satellite.

The optical communication module 115 may include an optical transmitting unit and an optical receiving unit.

The optical receiving unit may convert an optical signal into an electric signal and receive information. The optical receiving unit may include a photo diode (PD) for receiving light. The photo diode may convert light into an electric signal. For example, the optical receiving unit may receive information regarding a front vehicle through light emitted from a light source included in the front vehicle.

The optical transmitting unit may include one or more light emitting devices for converting an electric signal into an optical signal. The light emitting device may be a light emitting diode (LED). The optical transmitting unit may convert an electric signal into an optical signal and transmit the converted optical signal to the outside. For example, the optical transmitting unit may emit an optical signal to the outside by flickering a light emitting device corresponding to a predetermined frequency. According to the exemplary embodiment, the optical transmitting unit may include a plurality of light emitting device arrays. According to the exemplary embodiment, the optical transmitting unit may be integrated with a lamp included in the vehicle 100. For example, the optical transmitting unit may be at least one of a headlight, a taillight, a stop lamp, a turn signal lamp, and a sidelight.

The input unit 120 may include a driving operation means 121 (or driving operation device), a camera 122, a microphone 123, and a user input unit 124.

The driving operation means 121 may receive a user input for driving the vehicle 100. The driving operation means 121 may include a driving input means 121a (or driving input device), a shift input means 121b (or shift input device), an acceleration input means 121c (or acceleration input device), and a brake input means 121d (or brake input device).

The driving input means 121a may receive an input of a movement direction of the vehicle 100 from a user. The driving input means 121a may be in a wheel type so that driving may be input by a rotation thereof. According to the exemplary embodiment, the driving input means 121a may also be in a form of a touch screen, a touch pad, or a button.

The shift input means 121b may receive, from a user, an input of park P, drive D, neutral N, and reverse R of the vehicle 100. The shift input means 121b may be formed in a lever type. According to the exemplary embodiment, the shift input means 121b may also be in a form of a touch screen, a touch pad, or a button.

The acceleration input means 121c may receive, from a user, an input for acceleration of the vehicle 100. The brake input means 121d may receive, from a user, an input for deceleration of the vehicle 100. The acceleration input means 121c and the brake input means 121d may be in a pedal form. According to the exemplary embodiment, the acceleration input means 121c or the brake input means 121d may also be in a form of a touch screen, a touch pad, or a button.

The camera 122 may include an image sensor and an image processing module. The camera 122 may process a still image or a moving image obtained by the image sensor (for example, a complementary metal-oxide semiconductor (CMOS) or a charge-coupled device (CCD)). The image processing module may process a still image or a moving image obtained through the image sensor, extract necessary information, and transmit the extracted information to the control unit 180. The vehicle 100 may include the first camera 122a for photographing an image of a front side of the vehicle and a second camera 122b for photographing an image inside the vehicle.

The first camera 122a may be formed of a stereo camera to obtain a stereo image of the front side of the vehicle. The image processing module may provide information on a distance to an object detected from the stereo image through binocular parallax information.

The second camera 122b may obtain an image of a passenger. The second camera 122b may obtain an image for biometrics of a passenger.

The microphone 123 may process an external sound signal to electrical data. The processed data may be variously utilized according to a function currently performed by the vehicle 100. The microphone 123 may convert a sound command of a user into electrical data. The converted electrical data may be transmitted to the control unit 180.

According to the exemplary embodiment, the camera 122 or the microphone 123 may also be a constituent element included in the sensing unit 130, not the constituent element included in the input unit 120.

The user input unit 124 may be for receiving an input of information from a user. When the information is input through the user input unit 124, the control unit 180 may control an operation of the vehicle 100 so as to correspond to the input information. The user input unit 124 may include a touch-type input means (or device) or a mechanical input means (or device).

The sensing unit 130 may sense a signal related to travelling and the like of the vehicle 100. The sensing unit 130 may include a collision sensor, a wheel sensor, a speed sensor, an inclination sensor, a weight detection sensor, a heading sensor, a yaw sensor, a gyro sensor, a position module, a vehicle drive/reverse sensor, a battery sensor, a fuel sensor, a tire sensor, a driving wheel rotation-based driving sensor, a vehicle-inside temperature sensor, a vehicle-inside humidity sensor, an ultrasonic sensor, a radar, a lidar, and/or the like.

Accordingly, the sensing unit 130 may obtain a sensing signal for vehicle collision information, vehicle direction information, vehicle positioning information (GPS information), vehicle angle information, vehicle speed information, vehicle acceleration information, vehicle inclination information, vehicle drive/reverse information, battery information, fuel information, tire information, vehicle lamp information, vehicle-inside temperature information, vehicle-inside humidity information, and/or the like.

The sensing unit 130 may further include an acceleration pedal sensor, a pressure sensor, an engine speed sensor, an air flow sensor (AFS), an air temperature sensor (ATS), a water temperature sensor (WTS), a throttle position sensor (TPS), a thermal diffusion coefficient (TDC) sensor, a crank angle sensor (CAS), and/or the like.

The sensing unit 130 may include a biometric information detecting unit 131. The biometric information detecting unit 131 may detect and obtain biometric information regarding a passenger. The biometric information may include fingerprint scan information, iris scan information, retina scan information, hand geometry information, facial recognition information, and/or voice recognition information. The biometric information detecting unit 131 may include a sensor for sensing biometric information regarding a passenger. The camera 122 and the microphone 123 may operate as sensors. The biometric information detecting unit 131 may obtain hand geometry information and facial recognition information through the second camera 122b. The biometric information detecting unit 131 may obtain voice recognition information through the microphone 123.

The biometric information detecting unit 131 may further include a fingerprint scanner, an iris scanner, or a retina scanner for obtaining fingerprint scan information, iris scan information, or retina scan information regarding a passenger.

The output unit 140 (or output device) may be for outputting information processed by the control unit 180, and the output unit 140 may include a display unit 141, a audio output unit 142, and a haptic output unit 143.

The display unit 141 may display information processed by the control unit 180. For example, the display unit 141 may display vehicle-related information. The vehicle-related information may include vehicle control information for directly controlling the vehicle, or vehicle driving assistant information for guiding a driver of the vehicle to drive.

The display unit 141 may include at least one of a liquid crystal display (LCD), a thin film transistor-liquid crystal display (TFT LCD), an organic light-emitting diode (OLED) display, a flexible display, a 3D display and/or an e-ink display.

The display unit 141 may be formed in a mutual layer structure with a touch sensor or integrally formed with a touch sensor to implement a touch screen. The touch screen may serve as a user input unit 148 for providing an input interface between the vehicle 100 and a user, and provide an output interface between the vehicle 100 and the user. The display unit 141 may include a touch sensor for detecting a touch for the display unit 141 so as to receive a control command by a touch method. When a touch for the display unit 141 is generated by using the touch screen, the touch sensor may detect the touch, and the control unit 180 may generate a control command corresponding to the touch based on the detected touch. Contents input by the touch method may be characters or numbers, an instruction in various modes, and/or a designable menu item.

Two or more display units 141 may be provided. For example, the first display unit 141*a* may be formed in a cluster form, so that a driver may simultaneously drive and check information. The second display unit 141*b* may be provided in a predetermined area of a center fascia to be operated as an audio video navigation (AVN) device.

According to an exemplary embodiment, the display unit 141 may be implemented in a head up display (HUD). When the display unit 141 is implemented of an HUD, the display unit 141 may output information through a transparent display provided in the wind shield. Otherwise, the display unit 141 may include a projection module and output information through an image projected onto a wind shield.

The audio output unit 142 may convert an electric signal from the control unit 180 into an audio signal and output the converted audio signal. The audio output unit 142 may include a speaker and the like. The sound output unit 142 may output a sound corresponding to an operation of the user input unit 124.

The haptic output unit 143 may generate a tactile output. For example, the haptic output unit 143 may operate so as to vibrate a driving wheel, a seat belt, and a seat, and/or enable a user to recognize an output.

The vehicle driving unit 150 may control operations of various devices of the vehicle. The vehicle driving unit 150 may include a power source driving unit 151, a driving unit 152, a brake driving unit 153, a lamp driving unit 154, an air conditioner driving unit 155, a window driving unit 156, an airbag driving unit 157, a sunroof driving unit 158, and a suspension driving unit 159.

The power source driving unit 151 may electrically control a power source within the vehicle 100.

For example, when an engine based on fossil fuel is a power source, the power source driving unit 151 may electrically control the engine. Accordingly, an output torque and the like of the engine may be controlled. When the power source driving unit 151 is an engine, a speed of the vehicle may be limited by limiting an output torque of the engine under control of the control unit 180.

For example, when an electricity-based motor is a power source, the power source driving unit 151 may control the motor. Accordingly, a rotation speed, a torque, and/or the like of the motor may be controlled.

The driving unit 152 may electrically control a driving apparatus within the vehicle 100. Accordingly, a movement direction of the vehicle may be changed.

The brake driving unit 153 may electrically control a brake apparatus within the vehicle 100. For example, a speed of the vehicle 100 may be decreased by controlling an operation of a brake disposed in the wheel. For example, a movement direction of the vehicle 100 may be adjusted to a left direction or a right direction by differentiating operations of the brakes disposed at the left wheel and the right wheel, respectively.

The lamp driving unit 154 may control turn-on/turn-off of the lamps disposed inside and outside of the vehicle. The lamp driving unit 154 may control intensity, a direction, and/or the like of light of the lamp. For example, the lamp driving unit 154 may control the turn signal lamp, the stop lamp, and/or the like.

The air conditioner driving unit 155 may electrically control an air conditioner within the vehicle 100. For example, when a temperature inside the vehicle is high, the air conditioner driving unit 155 may control the air conditioner to operate so that cold air is provided inside the vehicle.

The window driving unit 156 may electrically control a window apparatus within the vehicle 100. For example, the window driving unit 156 may control opening or closing of left and right windows on lateral surfaces of the vehicle.

The airbag driving unit 157 may electrically control an airbag apparatus within the vehicle 100. For example, the airbag driving unit 157 may control so that an airbag is exploded in a danger situation.

The sunroof driving unit 158 may electrically control a sunroof apparatus within the vehicle 100. For example, the sunroof driving unit 158 may control opening or closing of the sunroof apparatus.

The suspension driving unit 159 may electrically control a suspension apparatus within the vehicle 100. For example, when a road surface has a curve, the suspension driving unit 159 may control vibration of the vehicle 100 to decrease by controlling the suspension apparatus.

The memory 160 may be electrically connected with the control unit 180. The memory 180 may store basic data for a unit (or device), control data for controlling an operation of a unit (or device), and/or input/output data. The memory 160 may be various hardware storage devices, such as a ROM, a RAM, an EPROM, a flash drive, and/or a hard drive.

The memory 160 may be matched with one or more wearable devices and store biometric information regarding a user of the wearable device. For example, the memory 160 may store fingerprint scan information, iris scan information, retina scan information, hand geometry information, facial recognition information, and voice recognition information regarding a user matched with the first wearable device.

The interface unit 170 may serve as a passage for various kinds of external devices connected to the vehicle 100. For example, the interface unit 170 may include a port connectable with the wearable device 300 or the mobile terminal 200, and be connected with the wearable device 300 or the mobile terminal 200 through the port. The interface unit 170 may exchange data with the wearable device 300 or the mobile terminal 200.

The interface unit 170 may serve as a passage for supplying electric energy to the connected wearable device 300 or mobile terminal 200. When the wearable device 300 or the mobile terminal 200 is electrically connected to the interface unit 170, the interface unit 170 may provide electric energy supplied from the power supply unit 190 to the wearable device 300 or the mobile terminal 200 under control of the control unit 180.

The control unit 180 may control a general operation of each unit (or device) within the vehicle 100. The control unit 180 may be called an engine control unit (ECU).

The control unit 180 may be implemented in a hardware type by using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and other electrical units for executing functions.

The power supply unit 190 may supply power necessary for operations of respective constituent elements under control of the control unit 180. More particularly, the power supply unit 190 may receive power from a battery inside the vehicle.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and/or the like.

Figure 4A:
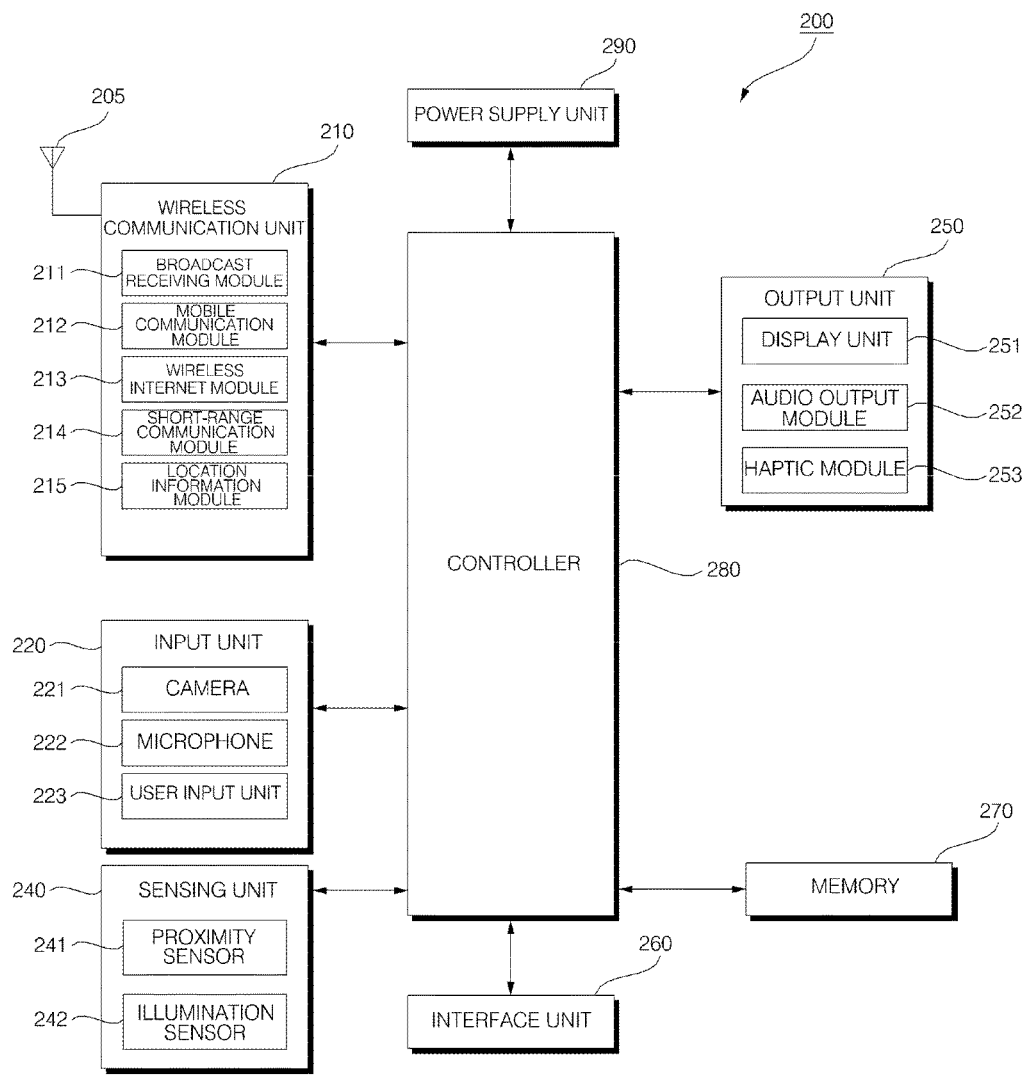
FIG. 4a is a block diagram of a mobile terminal in accordance with an embodiment.
Figure 4B:
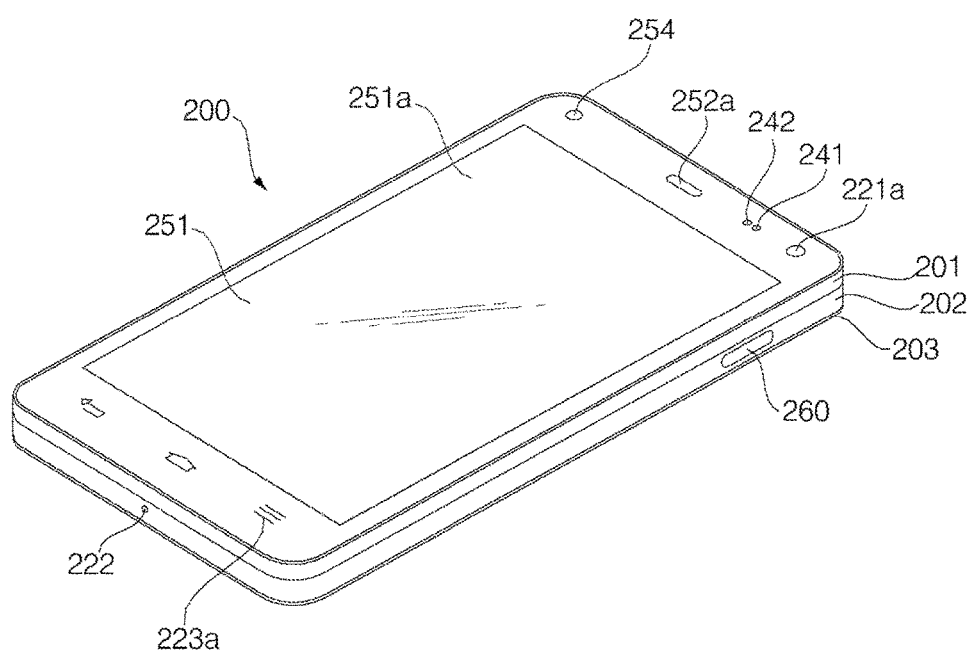
FIGS. 4b and 4c are conceptual views of one example of the mobile terminal, viewed from different directions.
Figure 4C:
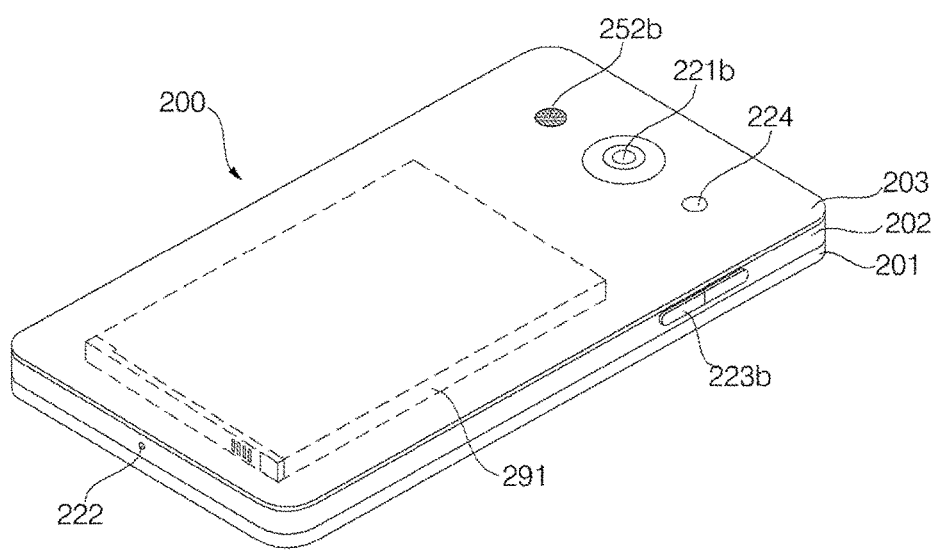

Reference may now be made to FIGS. 4a-4c, where FIG. 4a is a block diagram of a mobile terminal in accordance with an embodiment, and FIGS. 4b and 4c are conceptual views of one example of the mobile terminal, viewed from different directions. Other configurations may also be provided.

The mobile terminal 200 may have components such as a wireless communication unit 210, an input unit 220, a sensing unit 240, an output unit 250, an interface unit 260, a memory 270, a controller 280, and a power supply unit 290. It is understood that implementing all of the illustrated components is not a requirement, and that greater or fewer components may alternatively be implemented.

FIG. 4a shows the mobile terminal 200 having the wireless communication unit 210 configured with several commonly implemented components. The wireless communication unit 210 may include one or more components that permit wireless communication between the mobile terminal 200 and a wireless communication system or network within which the mobile terminal is located.

The wireless communication unit 210 may include one or more modules that permit communications such as wireless communications between the mobile terminal 200 and a wireless communication system, communications between the mobile terminal 200 and another mobile terminal, communications between the mobile terminal 200 and an external server. Further, the wireless communication unit 210 may include one or more modules that connect the mobile terminal 200 to one or more networks. To facilitate such communications, the wireless communication unit 210 may include one or more of a broadcast receiving module 211, a mobile communication module 212, a wireless Internet module 213, a short-range communication module 214, and a location information module 215.

The input unit 220 may include a camera 221 for obtaining images or video, a microphone 222, which is one type of audio input device for inputting an audio signal, and a user input unit 223 (for example, a touch key, a push key, a mechanical key, a soft key, and the like) for allowing a user to input information. Data (for example, audio, video, image, and the like) is obtained by the input unit 220 and may be analyzed and processed by the controller 280 according to device parameters, user commands, and combinations thereof.

The sensing unit 240 may be implemented using one or more sensors configured to sense internal information of the mobile terminal, the surrounding environment of the mobile terminal, user information, and/or the like. For example, in FIG. 4a, the sensing unit 240 is shown having a proximity sensor 241 and an illumination sensor 242.

The sensing unit 240 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, the camera 221), a microphone 222, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 200 may be configured to utilize information obtained from sensing unit 240, and in particular, information obtained from one or more sensors of the sensing unit 240, and/or combinations thereof.

The output unit 250 may be configured to output various types of information, such as audio, video, tactile output, and/or the like. The output unit 250 may include a display unit 251 (or display device), an audio output module 252, a haptic module 253, and an optical output module 254.

The display unit 251 may have an inter-layered structure or an integrated structure with a touch sensor in order to facilitate a touch screen. The touch screen may provide an output interface between the mobile terminal 200 and a user, as well as function as the user input unit 223 that provides an input interface between the mobile terminal 200 and the user.

The interface unit 260 may serve as an interface with various types of external devices that can be coupled to the mobile terminal 200. The interface unit 260 may include any of wired or wireless ports, external power supply ports, wired or wireless data ports, memory card ports, ports for connecting a device having an identification module, audio input/output (I/O) ports, video I/O ports, earphone ports, and/or the like. The mobile terminal 200 may perform assorted control functions associated with a connected external device, in response to the external device being connected to the interface unit 260.

The memory 270 may be implemented to store data to support various functions or features of the mobile terminal 200. For example, the memory 270 may be configured to store application programs executed in the mobile terminal 200, data or instructions for operations of the mobile terminal 200, and the like. Some of these application programs may be downloaded from an external server via wireless communication. Other application programs may be installed within the mobile terminal 200 at a time of manufacturing or shipping, which may be the case for basic functions of the mobile terminal 200 (for example, receiving a call, placing a call, receiving a message, sending a message, and the like). Application programs to be stored in the memory 270, installed in the mobile terminal 200, and executed by the controller 280 may perform an operation (or function) for the mobile terminal 200.

The controller 280 may function to control overall operation of the mobile terminal 200, in addition to operations associated with the application programs. The controller 280 may provide or process information or functions appropriate for a user by processing signals, data, information and the like, which are input or output by the various components depicted in FIG. 4a, or activating application programs stored in the memory 270. As one example, the controller 280 may control some or all of the components shown in FIGS. 4a-4c according to execution of an application program that have been stored in the memory 270.

The power supply unit 290 can be configured to receive external power or provide internal power in order to supply appropriate power required for operating elements and components included in the mobile terminal 200. The power supply unit 290 may include a battery, and the battery may be configured to be embedded in the terminal body, or configured to be detachable from the terminal body.

Referring to FIG. 4a, various depicted components may now be described in more detail. Regarding the wireless communication unit 210, the broadcast receiving module 211 may be configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 211 may be utilized to facilitate simultaneously receiving of two or more broadcast channels, and/or to support switching among broadcast channels.

The mobile communication module 212 may transmit and/or receive wireless signals to and from one or more network entities. Examples of a network entity may include a base station, an external mobile terminal, a server, and/or the like. Such network entities may form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 212 may include audio call signals, video (telephony) call signals, or various formats of data to support communication of text and multimedia messages.

The wireless Internet module 213 may be configured to facilitate wireless Internet access. This module may be internally or externally coupled to the mobile terminal 200. The wireless Internet module 213 may transmit and/or receive wireless signals via communication networks according to wireless Internet technologies.

Examples of such wireless Internet access may include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and/or the like. The wireless Internet module 213 may transmit/receive data according to one or more of such wireless Internet technologies, and other Internet technologies.

In some embodiments, when the wireless Internet access is implemented according to, for example, WiBro, HSDPA, HSUPA, GSM, CDMA, WCDMA, LTE, LTE-A and/or the like, as part of a mobile communication network, the wireless Internet module 213 may perform such wireless Internet access. As such, the Internet module 213 may cooperate with, or function as, the mobile communication module 212.

The short-range communication module 214 may be configured to facilitate short-range communications. Suitable technologies for implementing such short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and/or the like. The short-range communication module 214 may support wireless communications between the mobile terminal 200 and a wireless communication system, communications between the mobile terminal 200 and another mobile terminal 200, or communications between the mobile terminal and a network where another mobile terminal 200 (or an external server) is located, via wireless area networks. One example of the wireless area networks is a wireless personal area networks.

Another mobile terminal (that may be configured similarly to the mobile terminal 200) may be a wearable device, for example, a smart watch, a smart glass and/or a head mounted display (HMD), which is able to exchange data with the mobile terminal 200 (or otherwise cooperate with the mobile terminal 200). The short-range communication module 214 may sense or recognize the wearable device, and permit communication between the wearable device and the mobile terminal 200. When the sensed wearable device is a device that is authenticated to communicate with the mobile terminal 200, the controller 280, for example, may cause transmission of data processed in the mobile terminal 200 to the wearable device via the short-range communication module 214. A user of the wearable device may use the data processed in the mobile terminal 200 on the wearable device. For example, when a call is received in the mobile terminal 200, the user may answer the call using the wearable device. When a message is received in the mobile terminal 200, the user can check the received message using the wearable device.

The location information module 215 may be configured to detect, calculate, derive and/or otherwise identify a position of the mobile terminal. As an example, the location information module 215 may include a Global Position System (GPS) module, a Wi-Fi module, and/or both. The location information module 215 may alternatively or additionally function with any of the other modules of the wireless communication unit 210 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) that transmits or receives a wireless signal to or from the Wi-Fi module.

The input unit 220 may be configured to permit various types of input to the mobile terminal 220. Examples of such input may include audio, image, video, data, and user input. Image and video input may be obtained using one or more cameras 221. Such cameras 221 may process image frames of still pictures or video obtained by image sensors in a video or image capture mode. The processed image frames can be displayed on the display unit 251 or stored in the memory 270. The cameras 221 may be arranged in a matrix configuration to permit a plurality of images having various angles or focal points to be input to the mobile terminal 200. As another example, the cameras 221 may be located in a stereoscopic arrangement to acquire left and right images for implementing a stereoscopic image.

The microphone 222 may be implemented to permit audio input to the mobile terminal 200. The audio input can be processed in various manners according to a function being executed in the mobile terminal 200. The microphone 222 may include assorted noise removing algorithms to remove unwanted noise generated in the course of receiving the external audio.

The user input unit 223 may be a component that permits input by a user. Such user input may enable the controller 280 to control operation of the mobile terminal 200. The user input unit 223 may include one or more of a mechanical input element (for example, a key, a button located on a front and/or rear surface or a side surface of the mobile terminal 200, a dome switch, a jog wheel, a jog switch, and/or the like), or a touch-sensitive input, among others. As one example, the touch-sensitive input may be a virtual key or a soft key, which is displayed on a touch screen through software processing, or a touch key that is located on the mobile terminal at a location that is other than the touch screen. On the other hand, the virtual key or the visual key may be displayed on the touch screen in various shapes, for example, graphic, text, icon, video, and/or a combination thereof.

The sensing unit 240 may be configured to sense one or more of internal information of the mobile terminal, surrounding environment information of the mobile terminal, user information, and/or the like. The controller 280 cooperate with the sending unit 240 to control operation of the mobile terminal 200 or execute data processing, a function or an operation associated with an application program installed in the mobile terminal based on sensing provided by the sensing unit 240. The sensing unit 240 may be implemented using any of a variety of sensors, some of which may now be described in more detail.

The proximity sensor 241 may include a sensor to sense presence or absence of an object approaching a surface, or an object located near a surface, by using an electromagnetic field, infrared rays, and/or the like without a mechanical contact. The proximity sensor 241 may be arranged at an inner region of the mobile terminal covered by the touch screen, and/or near the touch screen.

The proximity sensor 241, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 241 can sense proximity of a pointer relative to the touch screen by changes of an electromagnetic field, which is responsive to an approach of an object with conductivity. The touch screen (touch sensor) may also be categorized as a proximity sensor.

The term "proximity touch" may be referred to herein to denote the scenario in which a pointer is positioned to be proximate to the touch screen without contacting the touch screen. The term "contact touch" may be referred to herein to denote the scenario in which a pointer makes physical contact with the touch screen. For the position corresponding to the proximity touch of the pointer relative to the touch screen, such position may correspond to a position where the pointer is perpendicular to the touch screen. The proximity sensor 241 may sense proximity touch, and proximity touch patterns (for example, distance, direction, speed, time, position, moving status, and the like).

The controller 280 may process data corresponding to proximity touches and proximity touch patterns sensed by the proximity sensor 241, and cause output of visual information on the touch screen. The controller 280 may control the mobile terminal 200 to execute different operations or process different data according to whether a touch with respect to a point on the touch screen is either a proximity touch or a contact touch.

A touch sensor can sense a touch applied to the touch screen, such as the display unit 251, using any of a variety of touch methods. Examples of such touch methods may include a resistive type, a capacitive type, an infrared type, and a magnetic field type, among others.

As one example, the touch sensor may be configured to convert changes of pressure applied to a specific part of the display unit 251, or convert capacitance occurring at a specific part of the display unit 251, into electric input signals. The touch sensor may also be configured to sense not only a touched position and a touched area, but also touch pressure and/or touch capacitance. A touch object may be used to apply a touch input to the touch sensor. Examples of touch objects may include a finger, a touch pen, a stylus pen, a pointer, and/or the like.

When a touch input is sensed by a touch sensor, corresponding signals may be transmitted to a touch controller. The touch controller may process the received signals, and then transmit corresponding data to the controller 280. Accordingly, the controller 280 may sense which region of the display unit 251 has been touched. The touch controller may be a component separate from the controller 280, the controller 280, and/or combinations thereof.

The controller 280 may execute the same or different controls according to a type of touch object that touches the touch screen or a touch key provided in addition to the touch screen. Whether to execute the same or different control according to the object that provides a touch input may be decided based on a current operating state of the mobile terminal 200 or a currently executed application program, for example.

The touch sensor and the proximity sensor may be implemented individually, and/or in combination, to sense various types of touches. Such touches may include a short (or tap) touch, a long touch, a multi-touch, a drag touch, a flick touch, a pinch-in touch, a pinch-out touch, a swipe touch, a hovering touch, and/or the like.

An ultrasonic sensor may be implemented to recognize position information relating to a touch object using ultrasonic waves. The controller 280, for example, may calculate a position of a wave generation source based on information sensed by an illumination sensor and a plurality of ultrasonic sensors. Since light may be much faster than ultrasonic waves, the time for which the light reaches the optical sensor may be much shorter than the time for which the ultrasonic wave reaches the ultrasonic sensor. The position of the wave generation source may be calculated using this fact. For example, the position of the wave generation source may be calculated using the time difference from the time that the ultrasonic wave reaches the sensor based on the light as a reference signal.

The camera 221 may include at least one a camera sensor (CCD, CMOS etc.), a photo sensor (or image sensors), and/or a laser sensor.

Implementing the camera 221 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. The photo sensor may include photo diodes and transistors at rows and columns to scan content received at the photo sensor using an electrical signal that changes according to the quantity of applied light. The photo sensor may calculate coordinates of the physical object according to variation of light to thus obtain position information of the physical object.

The display unit 251 may be configured to output information processed in the mobile terminal 200. For example, the display unit 251 may display execution screen information of an application program executing at the mobile terminal 200 or user interface (UI) and graphic user interface (GUI) information in response to the execution screen information.

The display unit 251 may be implemented as a stereoscopic display unit for displaying stereoscopic images. A stereoscopic display unit may employ a stereoscopic display scheme such as a stereoscopic scheme (a glass scheme), an auto-stereoscopic scheme (glassless scheme), a projection scheme (holographic scheme), and/or the like.

The audio output module 252 may be configured to output audio data. Such audio data may be obtained from any of a number of different sources, such that the audio data may be received from the wireless communication unit 210 or may have been stored in the memory 270. The audio data may be output during modes such as a signal reception mode, a call mode, a record mode, a voice recognition mode, a broadcast reception mode, and/or the like. The audio output module 252 can provide audible output related to a particular function (e.g., a call signal reception sound, a message reception sound, etc.) performed by the mobile terminal 200. The audio output module 252 may also be implemented as a receiver, a speaker, a buzzer, and/or the like.

A haptic module 253 can be configured to generate various tactile effects that a user feels, perceive, or otherwise experience. An example of a tactile effect generated by the haptic module 253 may be vibration. The strength, pattern and the like of the vibration generated by the haptic module 253 may be controlled by user selection or setting by the controller. For example, the haptic module 253 may output different vibrations in a combining manner or a sequential manner.

Besides vibration, the haptic module 253 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and/or the like.

The haptic module 253 can also be implemented to allow the user to feel a tactile effect through a muscle sensation such as the user's fingers or arm, as well as transferring the tactile effect through direct contact. Two or more haptic modules 253 may be provided according to the particular configuration of the mobile terminal 200.

An optical output module 254 can output a signal for indicating an event generation using light of a light source. Examples of events generated in the mobile terminal 200 may include message reception, call signal reception, a missed call, an alarm, a schedule notice, an email reception, information reception through an application, and/or the like.

A signal output by the optical output module 254 may be implemented in such a manner that the mobile terminal emits monochromatic light or light with a plurality of colors. The signal output may be terminated as the mobile terminal senses that a user has checked the generated event, for example.

The interface unit 260 may serve as an interface for external devices to be connected with the mobile terminal 200. For example, the interface unit 260 can receive data transmitted from an external device, receive power to transfer to elements and components within the mobile terminal 200, and/or transmit internal data of the mobile terminal 200 to such external device. The interface unit 260 may include wired or wireless headset ports, external power supply ports, wired or wireless data ports, memory card ports, ports for connecting a device having an identification module, audio input/output (I/O) ports, video I/O ports, earphone ports, and/or the like.

The identification module may be a chip that stores various information for authenticating a usage authority of the mobile terminal 200 and may include a user identity module (UIM), a subscriber identity module (SIM), a universal subscriber identity module (USIM), and the like. The device having the identification module (also referred to herein as an "identifying device") may take the form of a smart card. Accordingly, the identifying device can be connected with the terminal 200 via the interface unit 260.

When the mobile terminal 200 is connected with an external cradle, the interface unit 260 can serve as a passage to allow power from the cradle to be supplied to the mobile terminal 200 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 270 can store programs to support operations of the controller 280 and store input/output data (for example, phonebook, messages, still images, videos, etc.). The memory 270 may store data related to various patterns of vibrations and audio that are output in response to touch inputs on the touch screen.

The memory 270 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and/or the like. The mobile terminal 200 may also operate in relation to a network storage device that performs the storage function of the memory 270 over a network, such as the Internet.

The controller 280 may control general operations of the mobile terminal 200. For example, the controller 280 may set or release a lock state for restricting a user from inputting a control command with respect to applications when a status of the mobile terminal meets a preset condition.

The controller 280 may also perform controlling and processing associated with voice calls, data communications, video calls, and/or the like, or can perform pattern recognition processing to recognize a handwriting input or a picture drawing input performed on the touch screen as characters or images, respectively. The controller 280 can control one or a combination of those components in order to implement various exemplary embodiments disclosed herein.

The power supply unit 290 may receive external power or provide internal power and supply the appropriate power required for operating respective elements and components included in the mobile terminal 200. The power supply unit 290 may include a battery, which may be rechargeable or be detachably coupled to the terminal body for charging.

The power supply unit 290 may include a connection port. The connection port may be configured as one example of the interface unit 260 to which an external charger for supplying power to recharge the battery is electrically connected.

As another example, the power supply unit 290 may be configured to recharge the battery in a wireless manner without use of the connection port. The power supply unit 290 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 4b and 4c, the mobile terminal 200 may be described with reference to a bar-type terminal body. The mobile terminal 200 may alternatively be implemented in any of a variety of different configurations. Examples of such configurations may include watch-type, clip-type, glasses-type, or as a folder-type, flip-type, slide-type, swing-type, and swivel-type in which two and more bodies are combined with each other in a relatively movable manner, and combinations thereof. Discussion herein may relate to a particular type of mobile terminal (for example, bar-type, watch-type, glasses-type, and the like). However, such teachings with regard to a particular type of mobile terminal may apply to other types of mobile terminals.

The mobile terminal 200 may include a case (for example, frame, housing, cover, and the like) forming the appearance of the terminal. The case may be formed using a front case 201 and a rear case 202. Various electronic components may be incorporated into a space between the front case 201 and the rear case 202. At least one middle case may be additionally positioned between the front case 201 and the rear case 202.

The display unit 251 may be located on the front side of the terminal body to output information. As shown, a window 251a of the display unit 251 may be mounted to the front case 201 to form the front surface of the terminal body together with the front case 201.

In some embodiments, electronic components may also be mounted to the rear case 202. Examples of such electronic components may include a detachable battery 291, an identification module, a memory card, and/or the like. Rear cover 203 is shown covering the electronic components, and this cover may be detachably coupled to the rear case 202. Therefore, when the rear cover 203 is detached from the rear case 202, the electronic components mounted to the rear case 202 may be externally exposed.

As shown, when the rear cover 203 is coupled to the rear case 202, a side surface of the rear case 202 may be partially exposed. In some cases, upon the coupling, the rear case 202 may also be completely shielded by the rear cover 203. In some embodiments, the rear cover 203 may include an opening for externally exposing a camera 221b or an audio output module 252b.

The cases 201, 202, 203 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 200 may be configured such that one case forms the inner space. In this example, a mobile terminal 200 having a uni-body may be formed such that synthetic resin or metal extends from a side surface to a rear surface.

The mobile terminal 200 may include a waterproofing unit for preventing introduction of water into the terminal body. For example, the waterproofing unit may include a waterproofing member located between the window 251a and the front case 201, between the front case 201 and the rear case 202, or between the rear case 202 and the rear cover 203, to hermetically seal an inner space when those cases are coupled.

FIGS. 4b and 4c depict certain components as arranged on the mobile terminal. However, alternative arrangements are also possible and within teachings of the instant disclosure. Some components may be omitted or rearranged. For example, the first manipulation unit 223a may be located on another surface of the terminal body, and the second audio output module 252b may be located on the side surface of the terminal body.

The display unit 251 may output information processed in the mobile terminal 200. The display unit 251 may be implemented using one or more suitable display devices. Examples of such suitable display devices may include a liquid crystal display (LCD), a thin film transistor-liquid crystal display (TFT-LCD), an organic light emitting diode (OLED), a flexible display, a 3-dimensional (3D) display, an e-ink display, and/or combinations thereof.

The display unit 251 may be implemented using two display devices, which may implement the same or different display technology. For example, a plurality of the display units 251 may be arranged on one side, either spaced apart from each other, or these devices may be integrated, or these devices may be arranged on different surfaces.

The display unit 251 may also include a touch sensor that senses a touch input received at the display unit. When a touch is input to the display unit 251, the touch sensor may be configured to sense this touch and the controller 280, for example, may generate a control command or other signal corresponding to the touch. The content which is input in the touching manner may be a text or numerical value, or a menu item that can be indicated or designated in various modes.

The touch sensor may be configured in a form of a film having a touch pattern, disposed between the window 251a and a display on a rear surface of the window 251a, or a metal wire that is patterned directly on the rear surface of the window 251a. Alternatively, the touch sensor may be integrally formed with the display. For example, the touch sensor may be disposed on a substrate of the display or within the display.

The display unit 251 may also form a touch screen together with the touch sensor. The touch screen may serve as the user input unit 223 (see FIG. 4a). Therefore, the touch screen may replace at least some of the functions of the first manipulation unit 223a.

The first audio output module 252a may be implemented in the form of a speaker to output voice audio, alarm sounds, multimedia audio reproduction, and/or the like.

The window 251a of the display unit 251 may include an aperture to permit audio generated by the first audio output module 252a to pass. One alternative is to allow audio to be released along an assembly gap between the structural bodies (for example, a gap between the window 251a and the front case 201). A hole independently formed to output audio sounds may not be seen or is otherwise hidden in terms of appearance, thereby further simplifying the appearance and manufacturing of the mobile terminal 200.

The optical output module 254 can be configured to output light for indicating an event generation. Examples of such events may include a message reception, a call signal reception, a missed call, an alarm, a schedule notice, an email reception, information reception through an application, and/or the like. When a user has checked a generated event, the controller can control the optical output unit 254 to stop the light output.

The first camera 221a can process image frames such as still or moving images obtained by the image sensor in a capture mode or a video call mode. The processed image frames can then be displayed on the display unit 251 or stored in the memory 270.

The first and second manipulation units 223a and 223b are examples of the user input unit 223, which may be manipulated by a user to provide input to the mobile terminal 200. The first and second manipulation units 223a and 223b may also be referred to as a manipulating portion, and may employ any tactile method that allows the user to perform manipulation such as touch, push, scroll, or the like. The first and second manipulation units 223a and 223b may also employ any non-tactile method that allows the user to perform manipulation such as proximity touch, hovering, or the like.

FIG. 4b illustrates the first manipulation unit 223a as a touch key, but possible alternatives may also include a mechanical key, a push key, a touch key, and combinations thereof.

Input received at the first and second manipulation units 223a and 223b may be used in various ways. For example, the first manipulation unit 223a may be used by the user to provide an input to a menu, home key, cancel, search, and/or the like, and the second manipulation unit 223b may be used by the user to provide an input to control a volume level being output from the first or second audio output modules 252a or 252b, to switch to a touch recognition mode of the display unit 251, or the like.

As another example of the user input unit 223, a rear input unit may be located on the rear surface of the terminal body. The rear input unit can be manipulated by a user to provide input to the mobile terminal 200. The input may be used in a variety of different ways. For example, the rear input unit may be used by the user to provide an input for power on/off, start, end, scroll, control volume level being output from the first or second audio output modules 252a or 252b, switch to a touch recognition mode of the display unit 251, and the like. The rear input unit may be configured to permit touch input, a push input, or combinations thereof.

The rear input unit may be located to overlap the display unit 251 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at almost any location of the rear side of the terminal body.

Embodiments that include the rear input unit may implement some or all of the functionality of the first manipulation unit 223a in the rear input unit. In situations where the first manipulation unit 223a is omitted from the front side, the display unit 251 can have a larger screen.

As an alternative, the mobile terminal 200 may include a finger scan sensor that scans a user's fingerprint. The controller 280 can then use fingerprint information sensed by the finger scan sensor as part of an authentication procedure. The finger scan sensor may also be installed in the display unit 251 or implemented in the user input unit 223.

The microphone 222 may be located at an end of the mobile terminal 200, although other locations may be possible. Multiple microphones may be implemented, with such an arrangement permitting the receiving of stereo sounds.

The interface unit 260 may serve as a path allowing the mobile terminal 200 to interface with external devices. For example, the interface unit 260 may include one or more of a connection terminal for connecting to another device (for example, an earphone, an external speaker, or the like), a port for near field communication (for example, an Infrared Data Association (IrDA) port, a Bluetooth port, a wireless LAN port, and the like), and/or a power supply terminal for supplying power to the mobile terminal 200. The interface unit 260 may be implemented in the form of a socket for accommodating an external card, such as Subscriber Identification Module (SIM), User Identity Module (UIM), or a memory card for information storage.

The second camera 221b may be located at the rear side of the terminal body and include an image capturing direction that is substantially opposite to the image capturing direction of the first camera unit 221a. The second camera 221a may alternatively be located at other locations, or made to be moveable, in order to have a different image capturing direction from that which is shown.

The second camera 221b can include a plurality of lenses arranged along at least one line. The plurality of lenses may also be arranged in a matrix configuration. The cameras may be referred to as an "array camera." When the second camera 221b is implemented as an array camera, images may be captured in various manners using the plurality of lenses and images with better qualities.

As shown in FIG. 4c, a flash 224 may be adjacent to the second camera 221b. When an image of a subject is captured with the camera 221b, the flash 224 may illuminate the subject.

As shown in FIG. 4b, the second audio output module 252b can be located on the terminal body. The second audio output module 252b may implement stereophonic sound functions in conjunction with the first audio output module 252a, and may be also used for implementing a speaker phone mode for call communication.

At least one antenna for wireless communication may be located on the terminal body. The antenna may be installed in the terminal body or formed by the case. For example, an antenna that configures a part of the broadcast receiving module 211 may be retractable into the terminal body. Alternatively, an antenna may be formed using a film attached to an inner surface of the rear cover 203, or a case that includes a conductive material.

A power supply unit 290 for supplying power to the mobile terminal 200 may include a battery 291, which is mounted in the terminal body or detachably coupled to an outside of the terminal body. The battery 291 may receive power via a power source cable connected to the interface unit 260. The battery 291 can be recharged in a wireless manner using a wireless charger. Wireless charging may be implemented by magnetic induction or electromagnetic resonance.

The rear cover 203 may be coupled to the rear case 202 for shielding the battery 291, to prevent separation of the battery 291, and to protect the battery 291 from an external impact or from foreign material. When the battery 291 is detachable from the terminal body, the rear case 203 may be detachably coupled to the rear case 202.

An accessory for protecting an appearance or assisting or extending the functions of the mobile terminal 200 can also be provided on the mobile terminal 200. As one example of an accessory, a cover or pouch for covering or accommodating at least one surface of the mobile terminal 200 may be provided. The cover or pouch may cooperate with the display unit 251 to extend the function of the mobile terminal 200. Another example of the accessory is a touch pen for assisting or extending a touch input to a touch screen.

With reference to FIGS. 1 to 4, configurations of a vehicle and a mobile terminal have been described in detail. Hereinafter, according to exemplary embodiments, a pedestrian crash prevention system using bidirectional wireless communication between an autonomous vehicle and pedestrians and an operating method thereof may be described.

Figure 5:
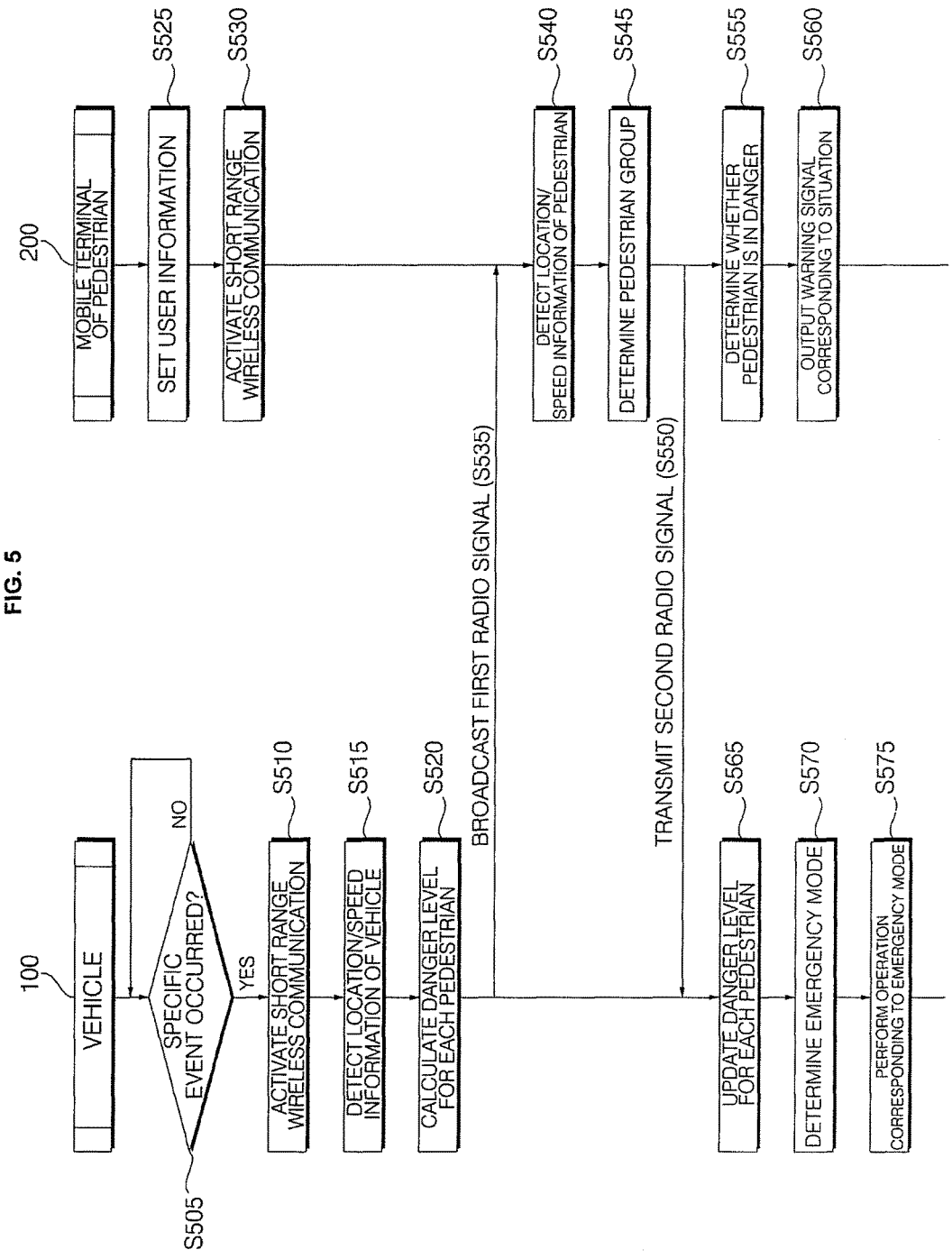
FIG. 5 is a flowchart for explaining an overall operation of a pedestrian crash prevention system according to an exemplary embodiment.

FIG. 5 is a flowchart for explaining an overall operation of a pedestrian crash prevention system according to an exemplary embodiment. Other embodiments and configurations may also be provided.

Referring to FIG. 5, the pedestrian crash prevention system may include an autonomous vehicle 100 and a mobile terminal 200 of pedestrians positioned around (or near) the autonomous vehicle 100.

The autonomous vehicle 100 may refer to a vehicle that recognizes a surrounding environment, determines a driving situation, and is controlled to be autonomously driven to a particular destination without driver intervention. The autonomous vehicle 100 may move a passenger to a preset destination according to a user request.

When a specific event has occurred during vehicle driving (S505), the autonomous vehicle 100 may activate predetermined short-range wireless communication (S510). The specific event that occurs during vehicle driving may be entrance of a vehicle onto a slow road (such as in front of a school, an apartment complex, and a parking lot), without being limited thereto. Other specific events may also be determined.

The predetermined short-range wireless communication may be Bluetooth communication, Wi-Fi communication, ZigBee communication, infrared communication, ultra-wideband (UWB) communication, and so on, and more preferably, Bluetooth low energy (BLE).

Upon entering onto the slow road, the autonomous vehicle 100 may detect (or determine) vehicle location information using a location information module 114 and detect (or determine) vehicle driving speed information using a speed measurement module (S515).

The autonomous vehicle 100 may calculate (or determine) a danger level for each pedestrian upon entering onto a slow road (S520) (or upon determining of the specific event). For an initial entry, the autonomous vehicle 100 may have no information about surrounding pedestrians, and thus may set a danger level for each pedestrian to "level 1" or "level 0" as an initial value.

The autonomous vehicle 100 may periodically broadcast a first radio signal including vehicle location and speed information and danger level information for each pedestrian (S535). When activated short-range wireless communication is Bluetooth communication, a beacon signal may be used as the first radio signal. The autonomous vehicle 100 may change a transmission period of the beacon signal based on updated danger level information for each pedestrian.

The mobile terminal 200 of a pedestrian may set user information required for determining a pedestrian group according to a user command (S525). The user information may include user age information, user disability information, user disability-type information, user disability degree information, and/or so on.

The pedestrian group may be classified into a predetermined number of groups according to a danger degree of a pedestrian. For example, Group 1 of a pedestrian may be classified as a safe pedestrian group, Group 2 may be classified as a pedestrian group that needs to be cautious, and Group 3 may be classified as a pedestrian group in danger.

The mobile terminal 200 may activate predetermined short-range wireless communication according to occurrence of a specific event, a user command, and/or the like (S530). The predetermined short-range wireless communication may be Bluetooth communication, Wi-Fi communication, ZigBee communication, infrared communication, ultra-wideband (UWB) communication, and so on, and more particularly, Bluetooth low energy (BLE).

While a pedestrian is moving and upon receiving a beacon signal from the autonomous vehicle 100, the mobile terminal 200 may store information items included in the beacon signal in the memory 270 and detect location and speed information of the pedestrian using the location information module 215 (S540).

Upon receiving the beacon signal, the mobile terminal 200 may determine a pedestrian group based on preset user information and current state information of a device (i.e. the mobile terminal) (S545). The device state information required for determining the pedestrian group may include screen on/off information, information regarding whether a headset/earphones (or hearing device) is connected to the device, pairing information with an accessory device associated with a pet, and so on.

The mobile terminal 200 may transmit, to the autonomous vehicle 100, a second radio signal including identification information of a device, location and speed information of a pedestrian, pedestrian group information, and so on. This may occur in response to the beacon signal (S550).

The mobile terminal 200 may determine whether a pedestrian is in danger based on at least one of vehicle location and speed information, pedestrian location and speed information, and pedestrian danger degree information simultaneously or after the second radio signal is transmitted (S555).

As the determination result, upon determining that the pedestrian is in danger, the mobile terminal 200 may output a warning signal (according to a situation) to a pedestrian (S560). That is, the mobile terminal 200 may output a warning signal such as a warning sound, a warning message, and vibration, thereby effectively preventing a crash with the pedestrian based on the warning signal.

The autonomous vehicle 100 may re-calculate a danger level of the corresponding pedestrian based on the vehicle position and speed information and the pedestrian location and speed information included in the received second radio signal (S565). The danger level may be classified into a predetermined number of levels according to a danger degree of a pedestrian.

The autonomous vehicle 100 may determine a level (or a type) of an emergency mode based on the re-calculated pedestrian danger level information and pedestrian group information included in the second radio signal, and perform an operation corresponding to the determined level of the emergency mode (S570, S575). The level of the emergency mode may be determined in order that the autonomous vehicle 100 may perform different response methods according to a pedestrian state in spite of the same danger level.

The level of the emergency mode may be classified into three types according to a response method of the autonomous vehicle 100. That is, a first emergency mode (EmergencyMode 1) may be an operating mode for performing pedestrian tracking, a second emergency mode (EmergencyMode 2) may be an operating mode for performing evasive driving, and a third emergency mode (EmergencyMode 3) may be an operating mode for immediately stopping driving of a vehicle. Other types or modes may also be provided.

According to another exemplary embodiment, it will be apparent to those skilled in the art to perform pedestrian tracking, evasive driving, or the like based on only the re-calculated danger level information without needing to determine an emergency mode.

Figure 6:
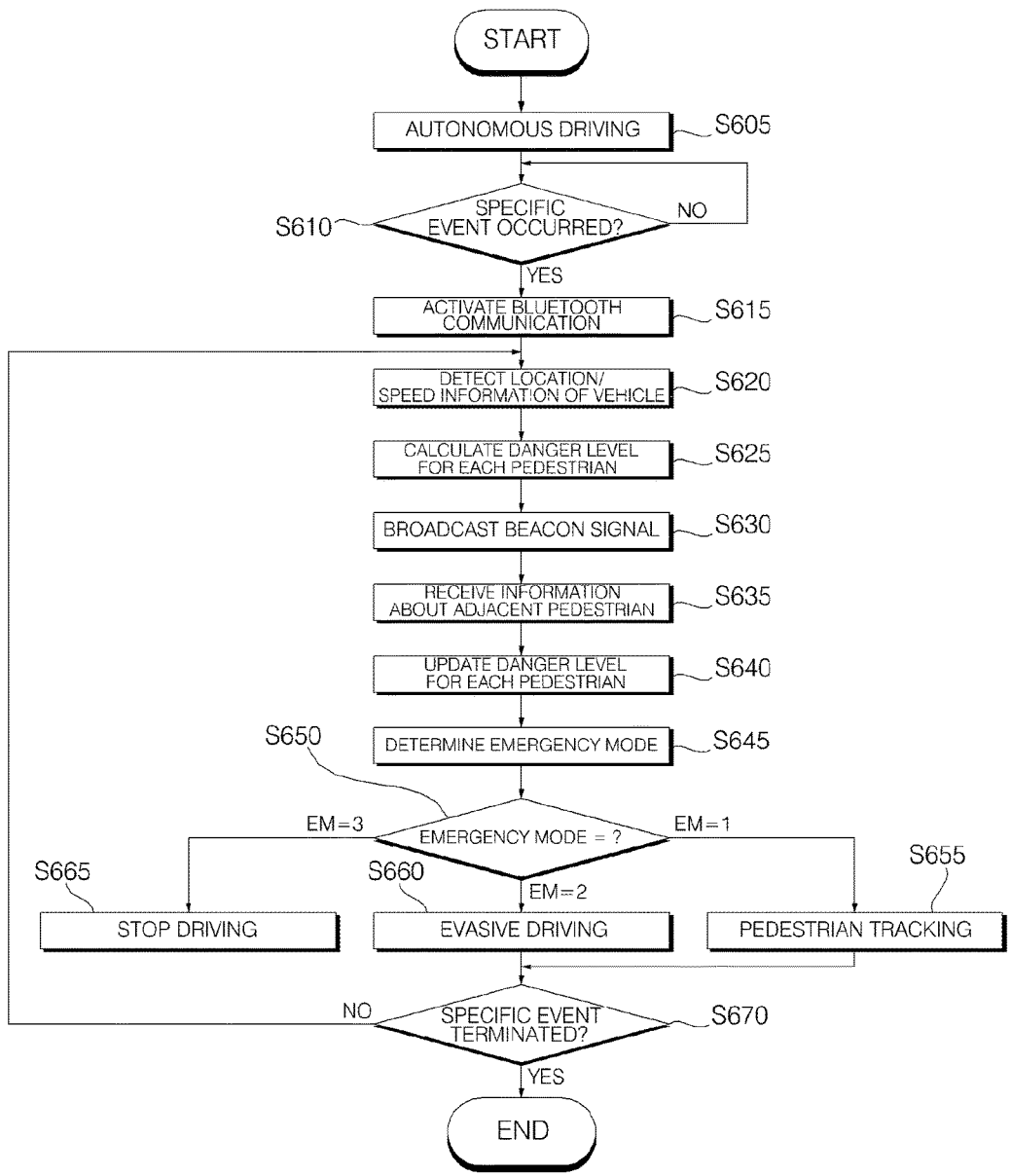
FIG. 6 is a flowchart for explaining an operation of an autonomous vehicle according to an exemplary embodiment.

FIG. 6 is a flowchart for explaining an operation of an autonomous vehicle according to an exemplary embodiment. Other embodiments and configurations may also be provided.

Referring to FIG. 6, the control unit 180 (or controller) may control the autonomous vehicle 100 to recognize a surrounding environment, to determine a driving situation, and to autonomously drive to a particular destination without driver intervention (S605).

During autonomous driving, when a specific event is determined to have occurred (or a specific driving condition has occurred (S610), the control unit 180 may automatically activate Bluetooth low energy (BLE) communication (S615). The specific event that occurs during autonomous driving may be an event in which a vehicle enters a slow road (such as in front of a school, in an apartment complex, and in a parking lot), without being limited thereto. Other events may also correspond to the specific event.

The control unit 180 may detect whether the specific event has occurred in real time with reference to surrounding image information photographed by a camera 122, navigation information stored in the memory 160, and so on.

Upon activating the BLE communication, the control unit 180 may detect (or determine) vehicle location information using the location information module 114 and detect (or determine) vehicle driving speed information using a speed measurement module (S620).

Upon activating the BLE communication, the control unit 180 may calculate (or determine) a danger level for each pedestrian (S625). In the initial calculation operation, the autonomous vehicle 100 may not have information regarding surrounding pedestrians, and thus the control unit 180 may set a danger level for each pedestrian to "level 1" or "level 0" as an initial value.

The control unit 180 may periodically broadcast a beacon signal including vehicle identification information, vehicle location and speed information, and danger level information for each pedestrian (S630). The control unit 180 may then reduce a transmission period of the beacon signal as an updated danger level for each pedestrian is increased.

According to another exemplary embodiment, the control unit 180 may periodically broadcast a beacon signal including only vehicle identification information and vehicle location and speed information without needing to calculate (or determine) a danger level for each pedestrian in a previous operation.

The control unit 180 may receive a response signal corresponding to the beacon signal from the mobile terminal(s) 200 of surrounding pedestrian(s) (S635) (or nearby pedestrian). The response signal may include identification information of the mobile terminal 200, location and speed information of pedestrians, pedestrian group information, and so on. In order to prevent locations of pedestrians from being missed, at least one Bluetooth module for receiving the corresponding response signal may be installed at each of front, back, right, and left positions of the autonomous vehicle 100.

The control unit 180 may receive a response signal corresponding to the beacon signal from beacon terminals positioned around (or at) a vehicle. According to the present embodiment, the beacon terminals may provide location and speed information of terminal users (i.e., pedestrians) positioned in a predetermined area. The beacon terminals may be classified into a fixed type beacon terminal and a mobile beacon terminal.

Figure 7:
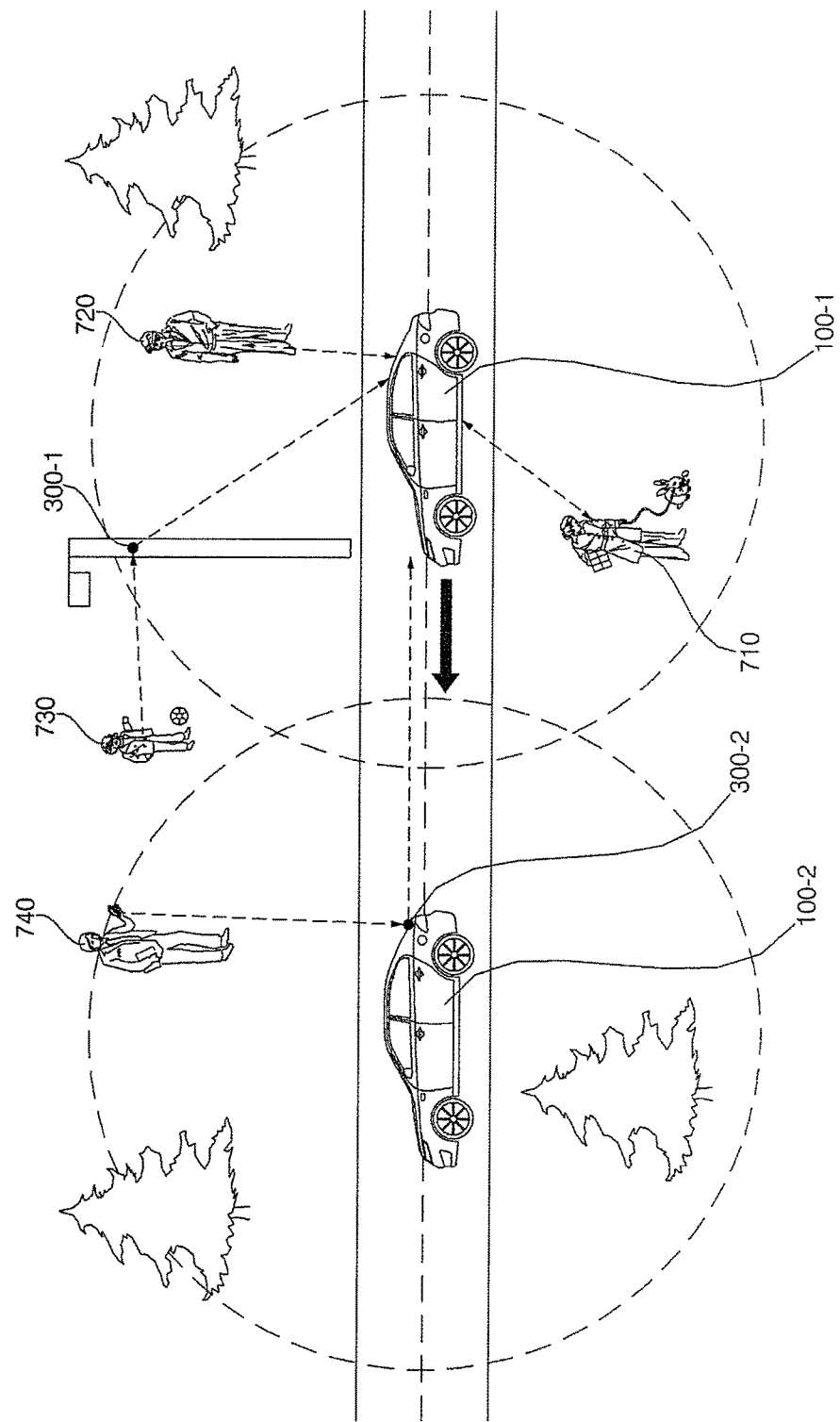
FIG. 7 is a diagram for explaining an operation of an autonomous vehicle that receives pedestrian information from mobile terminals of pedestrians and beacon terminals.

For example, as shown in FIG. 7, a first autonomous vehicle 100_1 may perform bidirectional communication with mobile terminals of first and second pedestrians 710 and 720 present in a communication network of the first autonomous vehicle 100_1 (a radius of approximately 60 m to 100 m) to acquire location and speed information regarding the corresponding pedestrians 710 and 720.

The first autonomous vehicle 100_1 may receive, from a fixed type beacon terminal 3000, location and speed information of a third pedestrian 730 positioned outside the communication network of the first autonomous vehicle 100_1, and receive location and speed information of a fourth pedestrian 740 from a mobile beacon terminal 300_2 installed in a second autonomous vehicle 100_2.

The autonomous vehicle 100 may accurately predict the location, moving speed, moving direction, moving path, and so on of surrounding pedestrians in conjunction with beacon terminals as well as mobile terminals of pedestrians so as to more effectively prevent possibility of a crash between a vehicle and pedestrians.

The control unit 180 may re-calculate a danger level of a corresponding pedestrian based on location and speed information of a vehicle, and location and speed information of a pedestrian, included in a response signal, when the response signal corresponding to the beacon signal is received (S640). The danger level may be classified into a predetermined number of levels according to a danger degree of a pedestrian.

For example, as shown in FIG. 8A, a danger level of a pedestrian 810 may be classified into a total of five levels, that is, level 1 to level 5 according to a danger degree of the corresponding pedestrian. Danger level 5 is a highest pedestrian danger level and is set when a pedestrian is positioned in front of the autonomous vehicle 100. Danger level 4 is the next highest danger level and is set when a pedestrian is a predetermined distance or more from the autonomous vehicle 100 even if the pedestrian is positioned on a driving road of the autonomous vehicle 100. Danger level 3 is the next danger level and is set when a pedestrian gradually approaches a driving road of the autonomous vehicle 100. Danger level 2 is the next danger level and is set when a pedestrian moves away from the autonomous vehicle 100 even if the pedestrian is positioned adjacent to a driving road of the autonomous vehicle 100. Danger level 1 is a safest level and is set when the pedestrian moves away from the autonomous vehicle 100 while being positioned in an area that is not adjacent to a driving road of the autonomous vehicle 100.

According to another exemplary embodiment, as shown in FIG. 8B, a pedestrian danger level may be classified into five danger levels according to a relative location between the autonomous vehicle 100 and the pedestrian. It will be apparent to those skilled in the art that the aforementioned classification of a danger level is merely an embodiment and that a danger level may be set via various other methods.

The control unit 180 may determine a level (or type) of an emergency mode based on re-calculated pedestrian danger level information and pedestrian group information included in the response signal (S645). A level of the emergency mode may be classified into a total of three types according to a response method of the autonomous vehicle 100.

Figure 9:
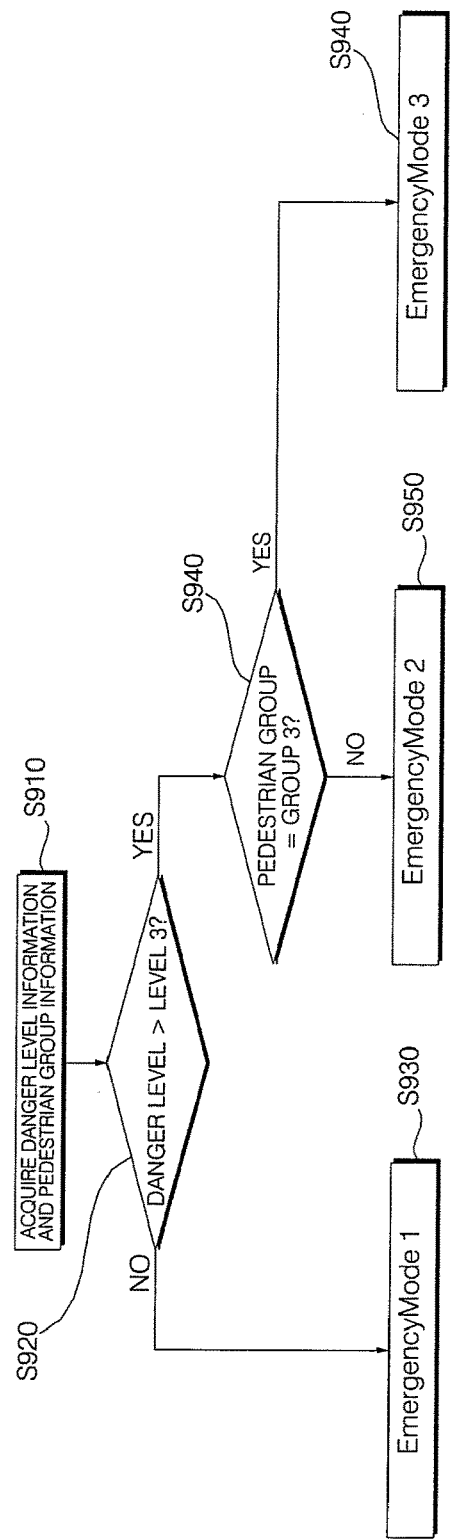
FIG. 9 is a diagram for explanation of method for classifying an emergency mode using danger level information and pedestrian group information.

For example, as shown in FIG. 9, when acquiring the danger level information and the pedestrian group information (S910), the control unit 180 may check (or determine) whether a danger level of a pedestrian exceeds a predetermined level (i.e., Level 3) (S920). As the check result, when the pedestrian danger level is equal to or less than a predetermined level (S920), the control unit 180 may determine a level of the emergency mode as the first emergency mode (EmergencyMode 1) (S930).

Meanwhile, as the check result, when a pedestrian danger level exceeds a predetermined level, the control unit 180 may check (or determine) whether the pedestrian group information acquired from a mobile terminal of the corresponding pedestrian corresponds to a predetermined pedestrian group (e.g., Group 3) (S940).

As the check result, when the pedestrian group information does not correspond to the predetermined pedestrian group (i.e., when the pedestrian group is Group 1 or Group 2), the control unit 180 may determine a level of the emergency mode as the second emergency mode (EmergencyMode 2) (S950). As the check result, when the pedestrian group information corresponds to a predetermined pedestrian group (i.e., when the pedestrian group is Group 3), the control unit 180 may determine a level of the emergency mode as the third emergency mode (EmergencyMode 3) (S960).

Referring to FIG. 6, when the determined level of an emergency mode is the first emergency mode (S650), the control unit 180 may continuously perform the pedestrian tracking operation while periodically transmitting a beacon signal (S655).

When the determined level of an emergency mode is the second emergency mode (S650), the control unit 180 may perform pedestrian evasive driving while reducing vehicle speed or changing a lane (S660). The control unit 180 may output a horn in order to warn pedestrians about possibility of a crash.

When the determined level of an emergency mode is the third emergency mode (S650), the control unit 180 may immediately stop the driving of the vehicle (S665). Upon a crash with a pedestrian, the control unit 180 may execute a pre-registered accident response guide. For example, the control unit 180 may contact an automobile insurance company, the 911 emergency service, and/or the like or request an emergency contact number to a device of the victim.

TABLE 1

| Danger Level | Pedestrian Group | Emergency Mode | Response Operation of Vehicle |
| --- | --- | --- | --- |
| Levels 1 to 3 | Groups 1, 2, and 3 | EmergencyMode 1 | Pedestrian Tracking |
| Level 4, 5 | Group 1, 2 | EmergencyMode 2 | Pedestrian Evasive Driving |
| Level 4, 5 | Group 3 | EmergencyMode 3 | Vehicle Driving Stop |

As shown in Table 1, the autonomous vehicle 100 may determine a type of an emergency mode based on the danger level information and the pedestrian group information and perform different operations according to the determined type of the emergency mode. It will be apparent to those skilled in the art that the aforementioned type of the emergency mode and the response operation of the vehicle according thereto are merely an embodiment and do not limit the feature and scope of the embodiments.

Figure 10:
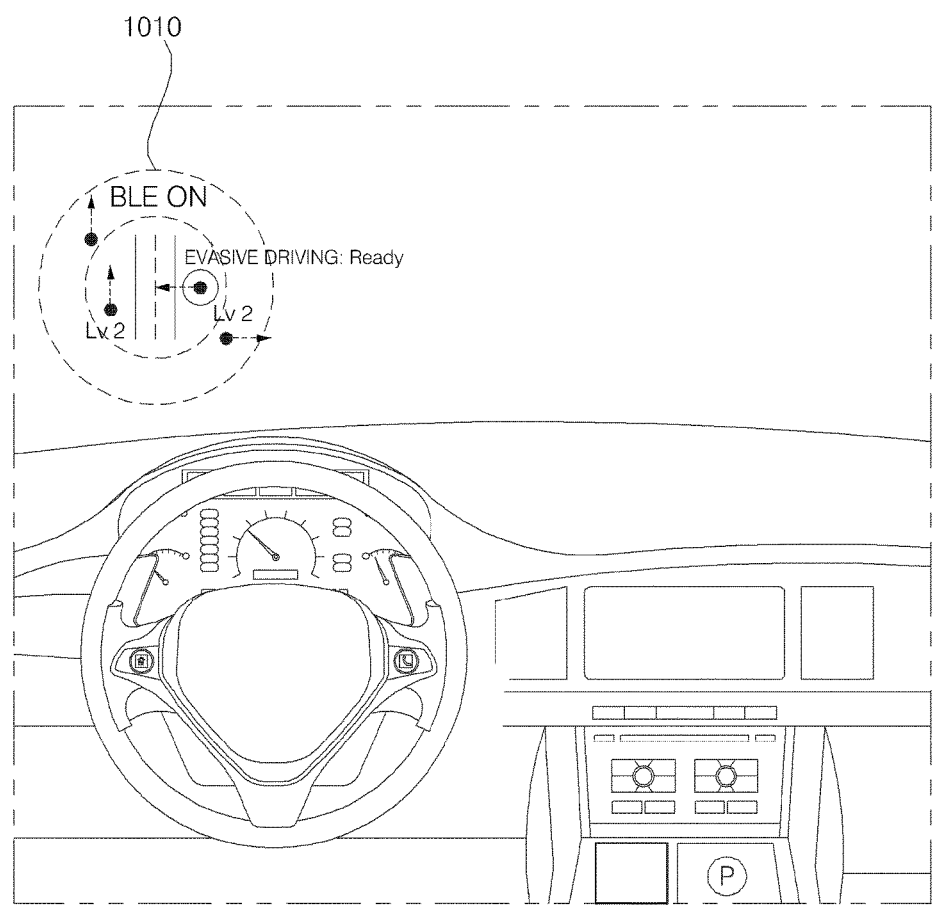
FIG. 10 is a diagram for explaining an operation of an autonomous vehicle that provides information regarding location, speed, moving direction, and danger level of adjacent pedestrians.

As shown in FIG. 10, the controller 280 may display a notification image 1010 including information regarding the location, speed, moving direction, danger level, response method, and so on of surrounding pedestrians on the display unit 251 installed in the vehicle.

When the specific event is terminated (S670), the control unit 180 may terminate a pedestrian crash prevention process in accordance with the present disclosure. When the specific event is not terminated, the control unit 180 may repeatedly perform the aforementioned operations 620 to 665.

As described above, when a specific event has occurred (or is determined to have occurred), an autonomous vehicle may prevent a crash with pedestrians using pedestrian information transmitted from adjacent mobile terminals.

Figure 11:
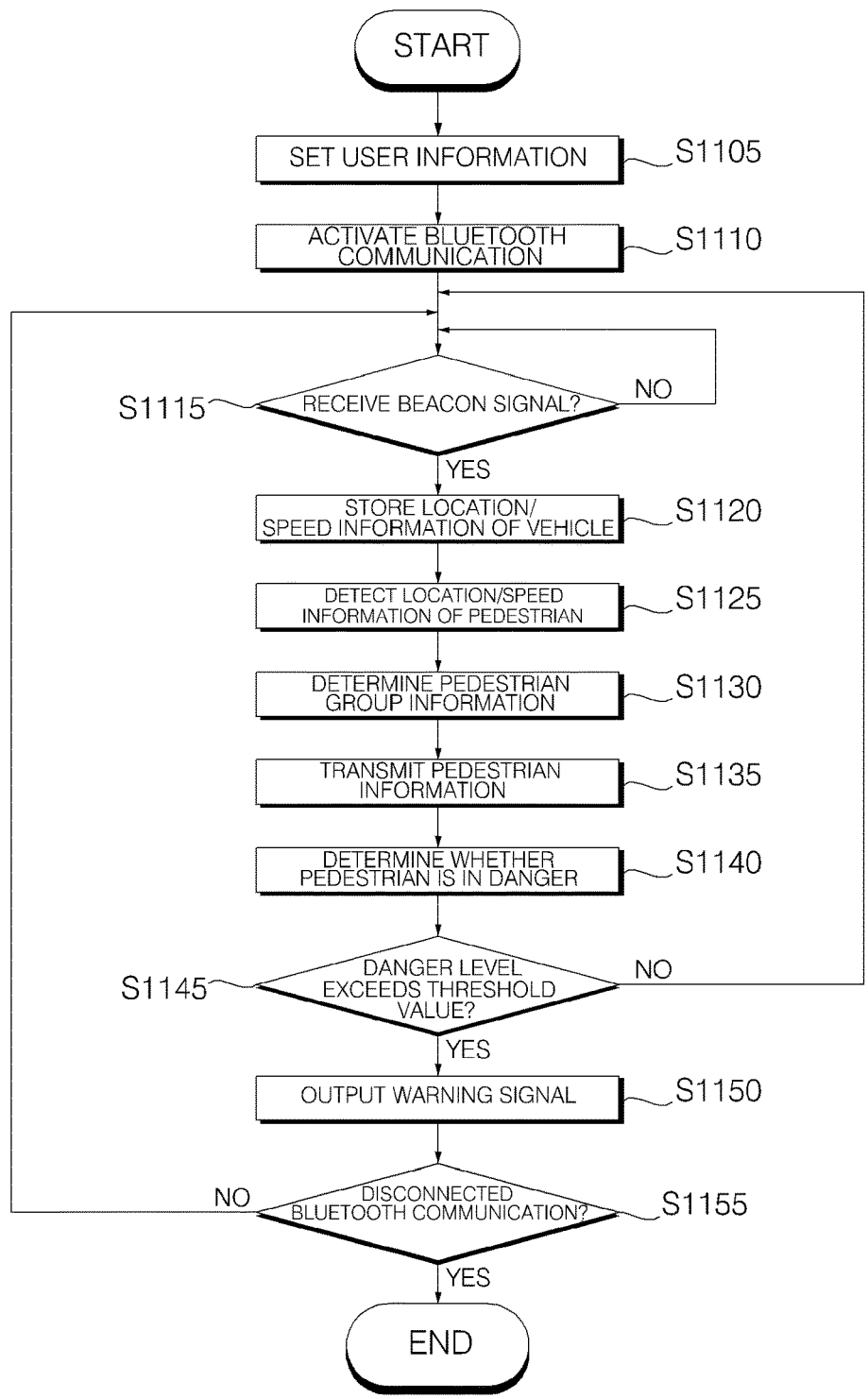
FIG. 11 is a flowchart for explaining an operation of a mobile terminal according to an exemplary embodiment.

FIG. 11 is a flowchart for explaining an operation of the mobile terminal 200 according to an exemplary embodiment. Other embodiments and operations may also be provided.

Referring to FIG. 11, the controller 280 may set user information required for determining a pedestrian group according to a user command or the like (S1105). For example, as shown in FIG. 12, when a user information setting menu 1215 of a setting screen 1210 is selected, the mobile terminal 200 may display a user information setting screen 1220 on the display unit 251. Accordingly, a user of the mobile terminal 200 may set name information, age information, disability information, user disability-type information, user disability degree information, and so on through the user information setting screen 1220.

The controller 280 may activate Bluetooth low energy (BLE) communication to enter a beacon reception mode in response to occurrence of a specific event, a user command, and/or the like (S1110). The specific event may be an event in which the pedestrian moves into a place such as in front of a school, in an apartment complex, and in a parking lot, without being limited thereto.

Upon receiving a predetermined beacon signal from the autonomous vehicle 100 (S1115), the controller 280 may store identification information of a vehicle, location and speed information of the vehicle, pedestrian danger level information, included in the beacon signal, in the memory 270 (S1120).

Upon receiving the beacon signal, the controller 280 may detect (or determine) the location and speed information of pedestrian using the location information module 215 (S1125).

Upon receiving the beacon signal, the controller 280 may determine a pedestrian group based on preset user information and current state information of the mobile terminal 200 (S1130). State information of the mobile terminal required for determining the pedestrian group may include image on/off information, information regarding whether a headset/earphones is connected to the mobile terminal, pairing information with an accessory device associated with a pet, and so on.

The pedestrian group may be classified into three groups according to a pedestrian danger degree. That is, a pedestrian group 1 (Group 1) may be a "safe pedestrian group" that accurately accepts pedestrian warning provided by the mobile terminal 200, group 2 (Group 2) may be a "pedestrian group to be cautious" that is capable of accepting pedestrian warning provided from the mobile terminal 200. Group 3 (Group 3) may be "pedestrian group in danger" that is likely to ignore a pedestrian warning provided from the mobile terminal 200.

Figure 13:
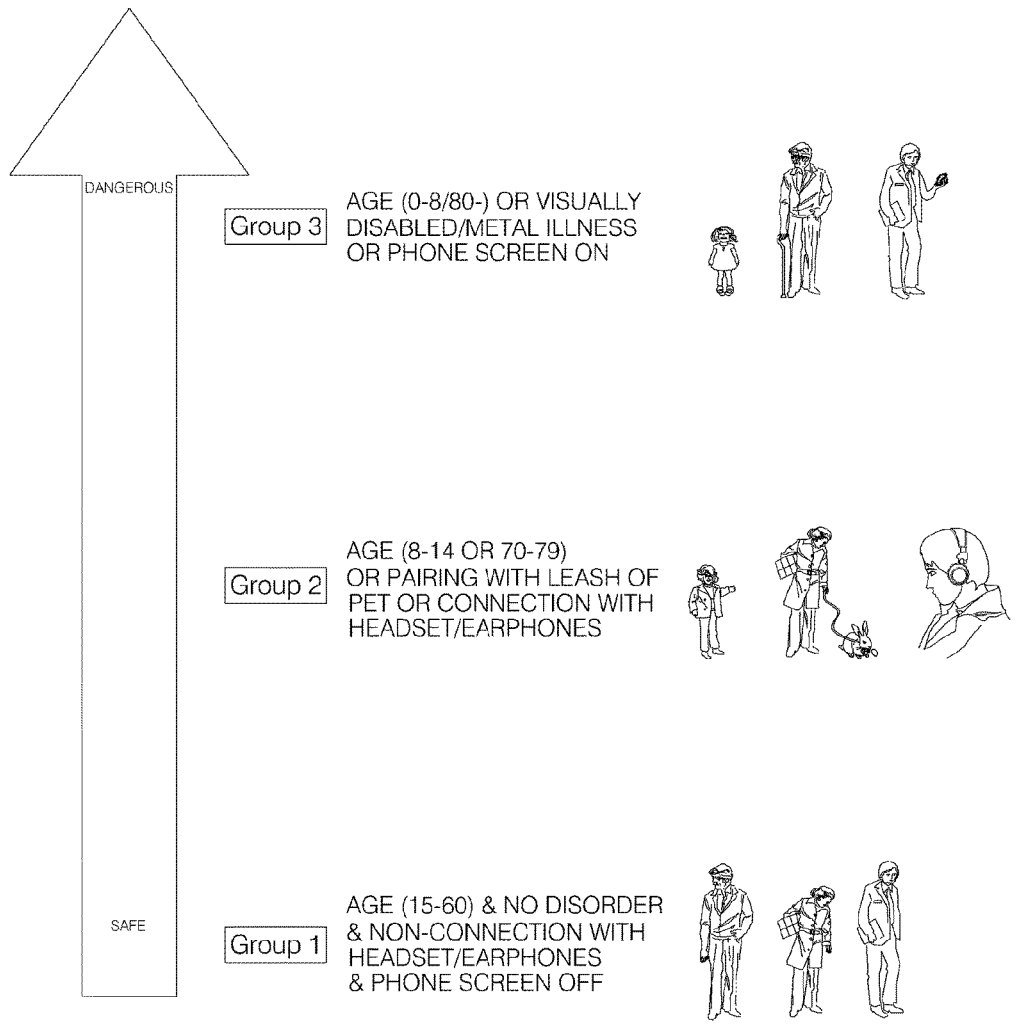
FIG. 13 is a diagram for explanation of a method for setting pedestrian group information based on user information and state information of a device.

As shown in FIG. 13, when a pedestrian is 15 to 60 years old, is not disabled, has no special disorder, and a current state of the device is a non-connection state of a headset/earphones and an off state of a screen of a portable phone, the corresponding pedestrian may be set as Group 1.

When a pedestrian is 8 to 14 or 60 to 79 years old or the device is paired with a device associated with a pet or a headset/earphones (or hearing device), the corresponding pedestrian may be set as Group 2.

When a pedestrian is 0 to 8 or 80 or more years old, is visually impaired, or has a mental illness, or a current state of the device is an off state of a screen of a portable phone, the corresponding pedestrian may be set as Group 3. It will be apparent to those skilled in the art that the aforementioned classification of a pedestrian group and that the pedestrian group may be set through various other methods.

The controller 280 may transmit a response signal including identification information of the mobile terminal 200, the location and speed information of a pedestrian, pedestrian group information, and so on to the autonomous vehicle 100 in response to the beacon signal (S1135).

The controller 280 may determine whether a pedestrian is in danger based on the location and speed information of the autonomous vehicle 100, location and speed information of the pedestrian, danger level information of the pedestrian, and so on simultaneously or after transmission of the response signal (S1140).

According to another exemplary embodiment, upon receiving a beacon signal including only identification information of a vehicle, and location and speed information of the vehicle from the autonomous vehicle 100, the controller 280 may determine whether the pedestrian is in danger based on the location and speed information of the autonomous vehicle 100, location and speed information of the pedestrian, and so on.

As the determination result, when a pedestrian danger level exceeds a threshold value (e.g., Level 3) (S1145), the controller 280 may output, to the pedestrian, a warning signal corresponding to a current situation (S1150).

For example, when the pedestrian uses a headset/earphones (or hearing device), the controller 280 may output a pedestrian warning voice through the headset/earphones. When the pedestrian is looking at a display screen of the mobile terminal 200, the controller 280 may display a pedestrian warning message on the display unit 251. The controller 280 may perform control to turn on a light emitting device or to flicker a screen in order to attract the attention of the pedestrian.

The controller 280 may output a text to speech (TTS) voice command for pedestrian warning through the audio output module 252. The controller 280 may control the haptic module 253 to output a vibration signal for pedestrian warning. The controller 280 may also output the same or similar warning signal to a wearable device that is operatively connected to the mobile terminal 200.

When the pedestrian is outside a specific place or Bluetooth communication is terminated according to a user command or the like (S1155), the controller 280 may terminate a pedestrian crash prevention process. When the pedestrian crash prevention process is not terminated, the controller 280 may repeatedly perform the aforementioned operations 1115 to 1150.

As described above, a mobile terminal may pre-warn a pedestrian about possibility of a crash with a vehicle using a beacon signal transmitted from an adjacent autonomous vehicle, thereby preventing a traffic accident that is not predicted by the pedestrian.

Accordingly, an object is to address the above-noted and other problems.

Another object is to provide a pedestrian crash prevention system and an operating method thereof, for preventing crash with pedestrians using pedestrian information transmitted from adjacent mobile terminals when a specific driving condition occurs.

Another object is to provide a pedestrian crash prevention system and an operating method thereof, for warning pedestrians regarding possibility of a crash with a vehicle using a beacon signal transmitted from an autonomous vehicle.

To achieve these and other advantages and in accordance with the purpose of embodiments, as embodied and broadly described herein, embodiments may provide in at least one aspect an autonomous vehicle including a short range communication module for providing a communication interface, and a control unit for, when a specific driving condition occurs, activating Bluetooth communication through the short range communication module, periodically broadcasting a beacon signal including vehicle location and speed information, and calculating a danger level for each pedestrian based on pedestrian information included in a response signal corresponding to the beacon signal.

In another aspect, embodiments may provide a method for controlling an autonomous vehicle including activating Bluetooth communication when a specific driving condition occurs, periodically broadcasting a beacon signal including vehicle location and speed information, receiving a response signal corresponding to the beacon signal from mobile terminals of surrounding pedestrians, and calculating a danger level for each pedestrian based on pedestrian information included in the received response signal.

In another aspect, embodiments may provide a mobile terminal including a short range communication module for providing a communication interface, and a controller for, upon receiving a beacon signal from an adjacent autonomous vehicle, transmitting a response signal including pedestrian location and speed information to the autonomous vehicle and determining whether a pedestrian is in danger based on vehicle location and speed information included in the beacon signal and the pedestrian location and speed information.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An autonomous vehicle comprising:
   a short range communication module configured to provide a communication interface; and
   a controller configured to:
   determine entrance of the autonomous vehicle onto a slow road,
   in response to the determined entrance of the autonomous vehicle onto the slow road:
   activate wireless communication using the short range communication module,
   determine vehicle location information,
   determine vehicle driving speed information, and
   broadcast a beacon signal that includes the vehicle location, the speed information, and danger level information for an initial entry that is set at an initial value,
   receiving a response signal corresponding to the beacon signal, and
   in response to receiving the response signal, determine a danger level for at least one pedestrian based on pedestrian information included in the response signal, and
   in response to the determined danger level for the at least one pedestrian, broadcast the beacon signal that includes the determined danger level information for the at least one pedestrian.

2. The autonomous vehicle according to claim 1, wherein the controller is configured to change a transmission period of the beacon signal based on the danger level information.

3. The autonomous vehicle according to claim 1, wherein the response signal is received from a mobile terminal of at least one pedestrian.

4. The autonomous vehicle according to claim 1, wherein the response signal is received from at least one of a fixed beacon terminal and a mobile beacon terminal.

5. The autonomous vehicle according to claim 1, wherein the pedestrian information includes pedestrian group information.

6. The autonomous vehicle according to claim 5, wherein the controller is configured to determine a level of an emergency mode at least based on pedestrian danger level information and the pedestrian group information.

7. The autonomous vehicle according to claim 6, wherein when the controller determines that the level of the emergency mode is a first emergency mode, the controller is configured to perform a pedestrian tracking operation while periodically transmitting the beacon signal.

8. The autonomous vehicle according to claim 7, wherein when the controller determines that the level of the emergency mode is a second emergency mode, the controller is configured to perform pedestrian evasive driving while the vehicle is reducing vehicle speed or changing a lane.

9. The autonomous vehicle according to claim 8, wherein when the controller determines that the level of the emergency mode is a third emergency mode, the controller is configured to perform a driving stop operation.

10. A method for controlling an autonomous vehicle, comprising:
    determining entrance of the autonomous vehicle onto a slow road;
    in response to determining the entrance of the autonomous vehicle onto a slow road, activating wireless communication;
    determining vehicle location information;
    determining vehicle driving speed information;
    broadcasting at least one beacon signal including the vehicle location, the speed information and danger level information for an initial entry that is set at an initial value;
    receiving a response signal corresponding to the beacon signal from a mobile terminal of at least one user;
    determine a danger level for the at least one user based on information included in the received response signal; and
    in response to the determined danger level for the at least one user, broadcast the beacon signal that includes the determined danger level information for the at least one user.

11. The method according to claim 10, further comprising changing a transmission period of the beacon signal based on the danger level information.

12. The method according to claim 10, wherein the response signal is received from a mobile terminal.

13. The method according to claim 10, wherein the response signal is received from a beacon terminal.

14. The method according to claim 10, further comprising determining a level of an emergency mode at least based on danger level information and group information.

15. The method according to claim 14, further comprising performing a tracking operation while periodically transmitting the beacon signal when the determined level of the emergency mode is a first emergency mode.

16. The method according to claim 15, further comprising performing evasive driving when the determined level of the emergency mode is a second emergency mode.

17. The method according to claim 16, further comprising performing a driving stop operation when the determined level of the emergency mode is a third emergency mode.

* * * * *